US008370341B1

(12) United States Patent
Cromwell et al.

(10) Patent No.: US 8,370,341 B1
(45) Date of Patent: Feb. 5, 2013

(54) SYSTEMS AND METHODS FOR DETERMINING AND FACILITATING CONTENT UPDATES FOR A USER DEVICE

(75) Inventors: Robert Cromwell, San Francisco, CA (US); Robert Benjamin Scott, San Francisco, CA (US); Aaron Haney, San Francisco, CA (US); Kenneth Lorenz Knowles, Berkeley, CA (US); Nolan Shea Myers, San Francisco, CA (US); Arthur Kopatsy, San Francisco, CA (US); Joshua John Forman, San Francisco, CA (US)

(73) Assignee: Inkling Systems, Inc., San Francisco, CA (US)

( * ) Notice: Subject to any disclaimer, the term of this patent is extended or adjusted under 35 U.S.C. 154(b) by 0 days.

(21) Appl. No.: 13/344,944

(22) Filed: Jan. 6, 2012

(51) Int. Cl.
*G06F 17/30* (2006.01)

(52) U.S. Cl. ......... 707/726; 707/672; 707/673; 707/662

(58) Field of Classification Search .................. None
See application file for complete search history.

(56) References Cited

U.S. PATENT DOCUMENTS

| | | | | |
|---|---|---|---|---|
| 5,047,918 A * | 9/1991 | Schwartz et al. | | 1/1 |
| 5,604,862 A * | 2/1997 | Midgely et al. | | 714/6.1 |
| 5,764,972 A * | 6/1998 | Crouse et al. | | 1/1 |
| 6,134,552 A * | 10/2000 | Fritz et al. | | 1/1 |
| 6,269,456 B1 * | 7/2001 | Hodges et al. | | 714/38.1 |
| 6,374,266 B1 * | 4/2002 | Shnelvar | | 1/1 |
| 6,401,239 B1 * | 6/2002 | Miron | | 717/173 |
| 6,405,219 B2 * | 6/2002 | Saether et al. | | 1/1 |
| 6,466,940 B1 * | 10/2002 | Mills | | 1/1 |
| 6,535,894 B1 * | 3/2003 | Schmidt et al. | | 1/1 |
| 6,546,555 B1 * | 4/2003 | Hjelsvold et al. | | 725/1 |
| 6,560,618 B1 * | 5/2003 | Ims | | 1/1 |
| 6,604,236 B1 * | 8/2003 | Draper et al. | | 717/170 |
| 6,629,110 B2 * | 9/2003 | Cane et al. | | 707/703 |
| 6,718,361 B1 * | 4/2004 | Basani et al. | | 709/201 |
| 7,069,092 B2 * | 6/2006 | Wiser et al. | | 700/94 |
| 7,113,962 B1 * | 9/2006 | Kee et al. | | 1/1 |
| 7,272,628 B1 * | 9/2007 | Pravetz et al. | | 709/203 |
| 7,298,451 B2 * | 11/2007 | Fancher | | 352/38 |
| 7,461,426 B2 * | 12/2008 | Gould et al. | | 7/102 |
| 7,523,452 B1 * | 4/2009 | Kamity et al. | | 717/178 |
| 7,536,725 B2 * | 5/2009 | Raciborski | | 726/30 |
| 7,552,300 B2 * | 6/2009 | Man et al. | | 711/165 |
| 7,587,433 B2 * | 9/2009 | Peleg et al. | | 1/1 |
| 7,590,939 B2 * | 9/2009 | Sareen et al. | | 715/731 |
| 7,644,111 B2 * | 1/2010 | Jaffri et al. | | 707/999.203 |
| 7,707,182 B1 * | 4/2010 | Kee et al. | | 707/638 |
| 7,711,771 B2 * | 5/2010 | Kirnos | | 709/203 |
| 7,792,682 B2 * | 9/2010 | Johnson | | 705/1.1 |
| 7,860,843 B2 * | 12/2010 | Dodd et al. | | 707/693 |
| 7,861,238 B2 * | 12/2010 | Saadi et al. | | 717/168 |

(Continued)

*Primary Examiner* — Farhan Syed
(74) *Attorney, Agent, or Firm* — Tarek N. Fahmi, APC

(57) ABSTRACT

A system, computer-readable storage medium storing at least one program, and a computer-implemented method for updating content are presented. A first version of content residing on a user device is determined, and a second version of content relating to the first version of content is determined. Version information for each file within a second set of files organized within a second archive of the second version of content is sequentially accessed based on a second order of the second set of files in the second archive, the version information indicating a version of each file. A determination is made of when version information indicating a newer version of content has been accessed from the second archive, and new content associated with the newer version is provided to the user device.

20 Claims, 17 Drawing Sheets

U.S. PATENT DOCUMENTS

| | | | |
|---|---|---|---|
| 7,873,602 B2* | 1/2011 | Debrunner | 707/661 |
| 7,895,245 B2* | 2/2011 | Li et al. | 707/810 |
| 7,937,753 B2* | 5/2011 | Hodges et al. | 726/12 |
| 8,060,711 B2* | 11/2011 | Hiraiwa et al. | 711/161 |
| 8,095,509 B2* | 1/2012 | Satya Sudhakar | 707/638 |
| 8,121,985 B2* | 2/2012 | Krebs | 707/687 |
| 2001/0034737 A1* | 10/2001 | Cane et al. | 707/204 |
| 2001/0042073 A1* | 11/2001 | Saether et al. | 707/203 |
| 2002/0010682 A1* | 1/2002 | Johnson | 705/59 |
| 2004/0003351 A1* | 1/2004 | Sommerer et al. | 715/517 |
| 2005/0050071 A1* | 3/2005 | Debrunner | 707/100 |
| 2005/0114672 A1* | 5/2005 | Duncan et al. | 713/182 |
| 2005/0257400 A1* | 11/2005 | Sommerer et al. | 36/13 |
| 2006/0004756 A1* | 1/2006 | Peleg et al. | 707/8 |
| 2006/0080351 A1* | 4/2006 | Powell et al. | 707/102 |
| 2007/0169097 A1* | 7/2007 | Al Saadi et al. | 717/168 |
| 2007/0260647 A1* | 11/2007 | Jaffri et al. | 707/203 |
| 2009/0043774 A1* | 2/2009 | Sudhakar | 707/9 |
| 2009/0248954 A1* | 10/2009 | Hiraiwa et al. | 711/100 |
| 2010/0023927 A1* | 1/2010 | Yang et al. | 717/120 |
| 2010/0325092 A1* | 12/2010 | Johnson | 707/673 |
| 2011/0087640 A1* | 4/2011 | Dodd et al. | 707/693 |
| 2012/0016850 A1* | 1/2012 | Borden et al. | 707/695 |

* cited by examiner

| MD1 for Archive 1, rev. 1 | | | |
|---|---|---|---|
| sequence | filename | version | path |
| 1 | A | 1 | /foo/section.html |
| 2 | B | 1 | /foo/intro.png |
| 3 | C | 1 | /foo/assessment.s9ML |

| MD1 for Archive 1, rev. 2 | | | |
|---|---|---|---|
| sequence | filename | version | path |
| 1 | B | 1 | /foo/intro.png |
| 2 | C | 1 | /foo/assessment.s9ML |
| 3 | A | 2 | /foo/section.html |

| MD1 for Archive 1, rev. 3 | | | |
|---|---|---|---|
| sequence | filename | version | path |
| 1 | B | 1 | /foo/intro.png |
| 2 | A | 2 | /foo/section.html |
| 3 | C | 3 | /foo/assessment.s9ML |

Fig. 14(a)

| MD2 for Archive 2, rev. 1 | | | |
|---|---|---|---|
| sequence | filename | version | path |
| 1 | D | 1 | /foo/intro.png |
| 2 | E | 1 | /foo/section.html |
| 3 | F | 1 | /foo/assessment.s9ML |
| 4 | G | 1 | /foo/section.txt |

| MD2 for Archive 2, rev. 2 | | | |
|---|---|---|---|
| sequence | filename | version | path |
| 1 | D | 1 | /foo/intro.png |
| 2 | E | 1 | /foo/section.html |
| 3 | F | 1 | /foo/assessment.s9ML |
| 4 | H | 2 | /foo/object.png |

| MD2 for Archive 2, rev. 3 | | | |
|---|---|---|---|
| sequence | filename | version | path |
| 1 | D | 1 | /foo/intro.png |
| 2 | E | 1 | /foo/section.html |
| 3 | F | 1 | /foo/assessment.s9ML |
| 4 | H | 2 | /foo/object.png |

Fig. 14(b)

SYSTEMS AND METHODS FOR DETERMINING AND FACILITATING CONTENT UPDATES FOR A USER DEVICE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011, Standard Nine Inc. (d.b.a. Inkling), All Rights Reserved.

BACKGROUND

As the use of personal computing devices to read or view content becomes more commonplace, there is a growing need to provide consumers with more efficient ways to update that content. Examples of content may include any digital content that a consumer may download onto their personal computing device, such as, e.g., books, newspapers, videogames, etc. For example, a consumer may purchase content in the form of a digital book for their personal computing device. When the consumer initially downloads the content for the digital book, the consumer may download the digital book in its entirety, which may be a lengthy process depending on the size of the book.

Additionally, authors of digital content may subsequently revise their content for many reasons. For example, a typographical error in a book may be detected, and the author may wish to revise the digital content to correct this mistake. If a consumer has downloaded an older version of the digital content containing the typographical error, the consumer may wish to subsequently update the content to reflect this correction. Typically, the consumer may need to download the updated version of the digital content in its entirety. While downloading the digital content in its entirely may be fast for smaller amounts of content, this process may be time-consuming and inefficient, especially for minor changes to large amounts of content.

One solution to this issue may be to provide custom patches between versions, enabling a consumer to download only the portion of content that has changed between those versions. Custom patches may provide instructions for downloading only the revised portions between one version of the content and another version of content. However, a custom patch is designed only for a specific pair of versions. For example, a custom patch designed for updating a first version of content to a second version of content may enable a consumer having the first version of content to download only the changes made in the second version of content. However, as several versions of the content are created, it may become difficult to use custom patches to update content across multiple revisions. For example, if a first version of content needs to be updated to the third version of the content, the custom patch created between the first and second versions may be used to update the content to the second version, and another custom patch created between the second and third versions may be used to update the content to the third version, resulting in unnecessary data being downloaded. Although a custom patch may be created between the first and third versions of content, creating custom patches for every pair of versions may be inefficient, especially as the number of versions increases.

SUMMARY

Disclosed in some examples are a system, computer-implemented storage medium storing at least one program, and a computer-implemented method for updating content. A first version of content residing on a user device is determined, the first version of content being associated with a first archive having a first set of files organized within the first archive in a first order based on when each file in the first set of files was last modified, each file within the first set of files being associated with the first version. A second version of content relating to the first version of content is determined, the second version of content being associated with a second archive having a second set of files organized within the second archive in a second order based on when each file in the second set of files was last modified, the second set of files having at least one new file (e.g., additional, modified, or deleted file) associated with the second version. Version information for each file within the second set of files is sequentially accessed based on the second order of the second set of files in the second archive, the version information indicating a version of each file. A determination is made of when version information indicating a newer version of content has been accessed from the second archive, including determining a first new file associated with when the version information indicating the newer version of content has been accessed, wherein the newer version of content was created after the first version of content was created. The first new file and any additional files being ordered within the second archive sequentially after the first new file are provided to the user device.

These examples may be combined in any permutation or combination. This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 14(a) and 14(b) depict examples of metadata for several versions of content according to some examples of the present disclosure.

DETAILED DESCRIPTION

Figure 1:
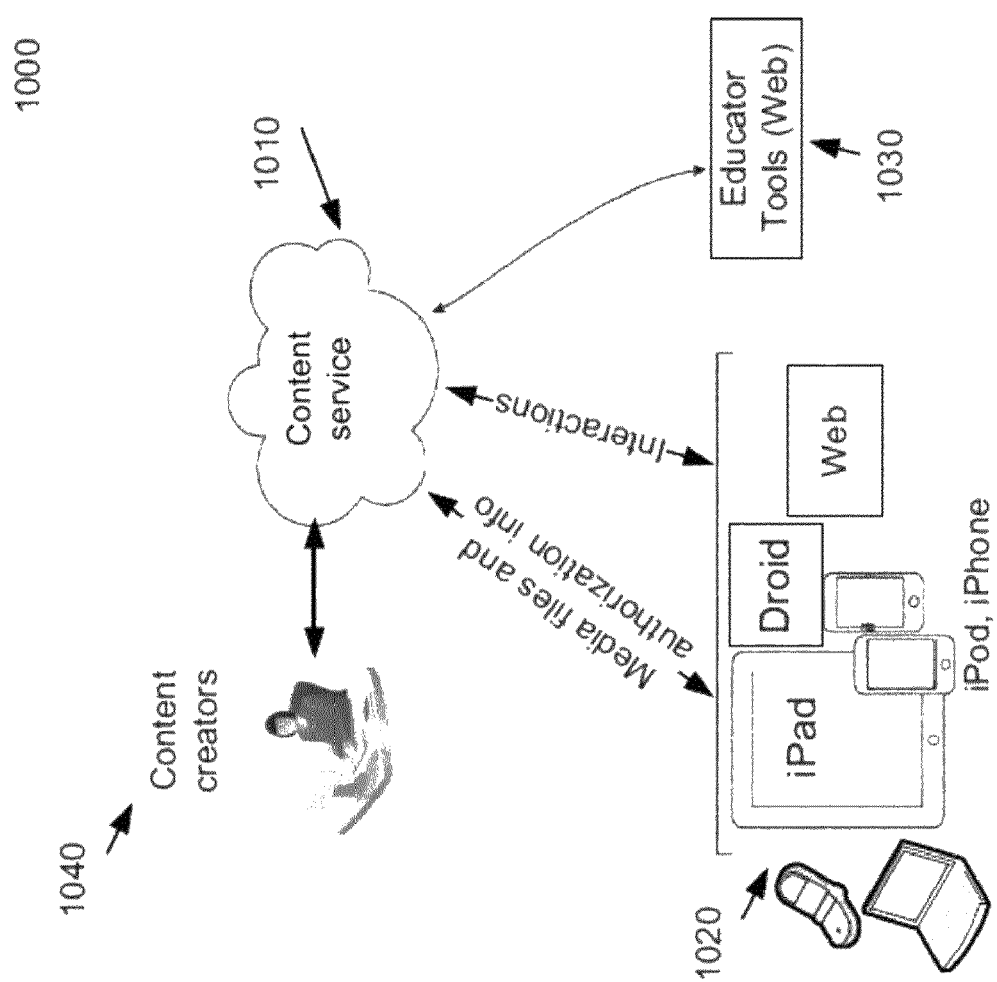
FIG. 1 shows a system according to some examples of the present disclosure.

Disclosed are systems and methods for updating content on a computing device of a user. A content service may provide content created by authors to a user's personal computing device, such as an electronic book by an author, for example. Many times, authors may wish to update the content they have created for any number of reasons (e.g., typographical errors, updating citations, etc.). The content service may allow an author to submit an updated version of the content. The updated version of the content can be provided to a user who has previously downloaded any older version of the content. The updated version may be provided to the user's personal computing device by providing the differences between the content existing on the user's device and the updated content, thereby avoiding the need to download the updated contents in their entirety.

When an author submits content to the content service, the content may be organized into one or more archives having one or more files containing the content. The files may be organized in the order in which the files were created and/or last modified, including when one or more source files used to create the files was last modified. The files may also be associated with a particular version of the content. When an author makes a revision to one or more of the files, the files are reordered within the archive such that the files remain organized based on when the files were created and/or last modified. For example, if a particular file in an archive were modified by the author, the content service may associate the file with that particular version of the content and may reorganize the files in the archive so that the particular modified file moves to the bottom of the list of files.

When content on a user device is to be updated to a particular version of the content, the content service can determine the version of the content residing on the user device and update that content with the differences between the updated version and the current version residing on the user device.

Since the archives of files are organized according to when the files were last modified, and since each file is associated with a version corresponding to when each file was created or last modified, the content service can perform a linear search through the files and determine the first new file in the archive that is associated with a newer version of content, the newer version being a version that was created after the version already residing on the user device. The content service may allow the user device to download that first new file and any files that are ordered sequentially after the first new file, as these files include the files that were changed from the current version to the updated version.

Additionally, when the updated version includes a deletion of a file in an older version of the content, the content service may determine the files that are included within the archive associated with the older version and the files that are included within the archive associated with the new version. The content service may compare the list of files in each archive to determine the files missing from the new version of content. The content service may instruct the user device to delete the files that were not included in the new version of the content. In some embodiments, a record of deleted files may be maintained, which may include information about files that have been deleted and when (e.g., during which revisions) the files were deleted. This record may be used to determine which files have been deleted between versions of the content and to delete those files accordingly.

The lists of files within an archive as well as information about the organization of the files (e.g., the order of the files based on when the files were last created and/or modified) may be included in metadata for the archive. Performing linear searches through this information to determine the changed content between versions allows for faster and more efficient updating of content on a user device.

While the present disclosure may describe certain operations with respect to electronic books, these operations are equally applicable to other types of media, including electronic pamphlets, magazines, video games, newspapers, study aids, practice questions, or the like, as well as electronic books. It should also be appreciated that those operations are equally applicable to portions of those materials.

FIG. 1 shows a system 1000, according to some examples, including a content service 1010, electronic reader devices 1020, educator tools 1030, and content creators 1040.

The content service 1010 receives content from content creators 1040 and transforms the content in the content ingestion processes to a platform-independent digital specification. In some examples, the content may be an electronic book. This representation is then placed in storage where users running an execution environment on the reader devices 1020 may download or otherwise access these media files. Additionally, authorization information for users and/or electronic reader devices 1020 may be transferred between the content service 1010 and the electronic reader devices 1020. The electronic reader devices 1020 present the content to the users of the electronic reader devices 1020. Users may then interact with the content on the electronic reader devices 1020 and also with other users of the content through social networking applications running in the content service 1010.

Electronic Book

In some examples, an electronic book may contain content presentation objects including but not limited to images, graphics, figures, audio, text, video, interactive content presentation objects, interactive assessment objects, and any other contents that a content creator may choose to include in an electronic book. An interactive content presentation object may be any information and/or experiences presented by the electronic reader to an end-user that allows for user interaction. An interactive assessment object is any information and/or experiences presented by the electronic reader to an end-user to assess their knowledge (e.g., of or about content provided as part of an interactive content presentation object). In some examples, an interactive assessment object is an object that, when presented by an electronic reader, presents a question or series of questions along with audio, video, audio-video, text, graphics, and/or the like to test a user's knowledge of a part of the book, or other content. Types of interactive assessments include, but are not limited to: multiple choice, matching, reordering, audio-based assessments, and the like.

User interactions may be any user action that acts on, with, or about the interactive content presentation objects or interactive assessment objects. User interactions may include, in some examples, user bookmarks of certain locations in the book, user comments, notes, or questions left at a certain point of the book, user highlighting of the book, user quoting of the book, user manipulation of the various interactive elements of the interactive content presentation or assessment objects such as zooming, panning, and rotating graphics, and the like. In some examples, the interactivity may be social so that other users viewing the interactive content presentation object may see at least a portion of another user's interactions. Thus, for example, a user may leave a note or question that some, or all, of the individuals also viewing that content presentation may see, read, answer, or react to. In other examples, the user may leave a note to an instructor, who may respond. In still other examples, an individual may share a bookmark indicating the current user's reading location to other users.

In some embodiments, an electronic book may be represented in a platform independent way, which is then executed by execution environments on various heterogeneous devices to produce a visually consistent presentation of contents. The contents may be presented using locally available application programming interfaces such that the user interface style matches that of the device. Thus, for example, when the book is executed on a Windows™ device, it will appear to match the Windows™ style, but on an iOS™ device such as an iPad™, will match the iOS™ look and feel. Windows™ is an operating system developed by Microsoft™, Inc. of Redmond, Wash. iOS™ is a different operating system developed by Apple®, Inc. of Cupertino, Calif.

Figure 2:
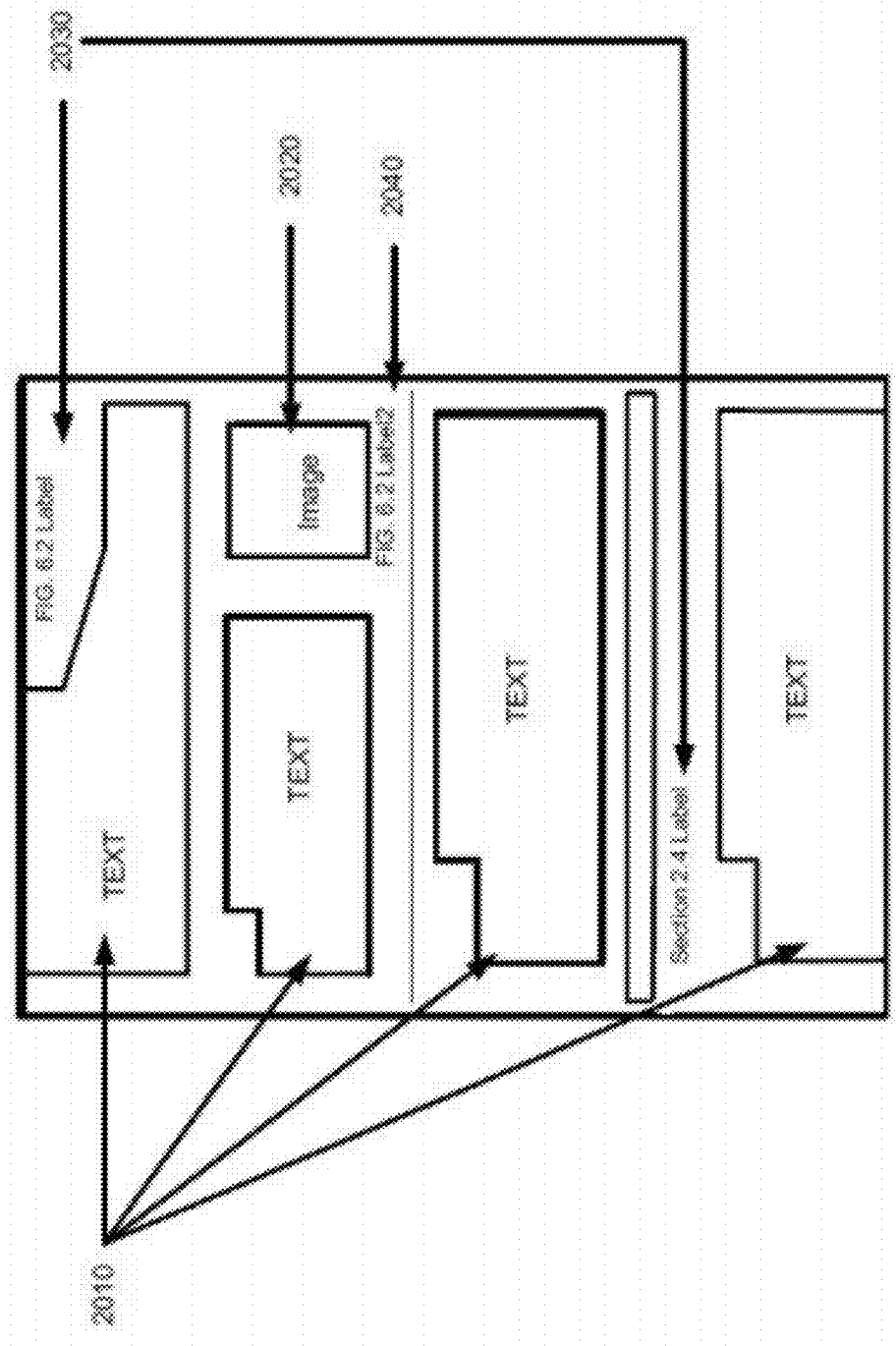
FIG. 2 shows a media card according to some examples of the present disclosure.

The electronic books and the constituent content presentation objects may be created by content authors using digital content templates. Content templates, or blueprints, consist of a number of standardized content presentation formats, or shells, which authors use as a basis for producing the various content presentation objects. In some examples, only content presentation objects created with a content blueprint will be valid content recognized by the execution environment. This may be to ensure that the content is properly handled, recognized, and displayed by the various execution environments running on the different types of electronic readers. In some examples, the blueprint may be an extensible markup language (XML) file, a hypertext markup language (HTML) file, or the like. Once a blueprint is instantiated, it may be called a "media card." An example abstraction of a media card is shown in FIG. 2 which shows one or more text sections 2010 and one or more image sections 2020 along with header sections 2030 and image caption 2040 arranged in a desired order.

In some examples, while the various blueprints are described in a platform-agnostic manner, the various media cards formed from those blueprints may be displayed differently depending on the electronic reader platform. This is because different devices may have different capabilities. For example, an iPhone™ may not be able to display the same image resolution as an iPad™ Therefore, in some examples, the image, video, audio, or other media may be adjusted depending on the device capabilities. Device capabilities that may impact the presentation layout may include screen size, screen resolution, video capabilities, audio capabilities, and the like. As a result of these differences the layout of the card may be impacted. Therefore, in some examples, the blueprints and associated media (such as images) may be processed in the content service such that even if the two different reader devices have different capabilities (for example, the image capabilities of the two devices are different), the blueprints and the associated media objects are adjusted for that platform to display everything in a visually consistent manner that is platform appropriate. Thus, for example, the images, the interactions, the layouts, and the like are displayed in the right locations, in a platform appropriate manner and according to the capabilities of the device. The platform appropriate manner refers to the look and feel of the user interface elements of the reader. Thus the electronic book will have an iOS™ look and feel on an iPad™, but a Windows™ look and feel on a Windows™ device. Thus, for example, even though an image may be in a different place, with different resolutions, the interactions with that image and the layout appear consistent—e.g., in the correct place and in a user-friendly manner.

The content service system may be aware of the characteristics of a given target device, such as its display size, the pixel density of the display, its aspect ratio, whether it supports touch-based input, how much memory is available to the application, and other characteristics. The system may preprocess data for a given target device. For example, for low-resolution displays, or for systems with limited amounts of runtime memory available to the application, lower resolution versions of the data may be sent to the device. Furthermore, if a device lacks touch-based input support, a mouse-and-keyboard based interface may be presented to the user. If devices have high-density pixel displays, such as Apple®, Inc's "Retina Display," images and icons can be displayed at a higher resolution than devices that lack such pixel density. The system may make modifications to the data before sending to the device, or the device may interpret the data differently at runtime. In both cases, the platform independent representation of the content being displayed is the same.

Some example content blueprints may include a table of contents blueprint for displaying the electronic book's table of contents, a reader blueprint for text and graphics, an image figure blueprint, a multi-image figure (or slideshow) blueprint, a GUIDED TOUR™ blueprint (e.g., a blueprint in which a user navigates through a series of locations in a particular image or a series of events within a timeline), a TEST YOURSELF™ blueprint (e.g., a blueprint in which a user is presented with an interactive exercise for properly identifying labeled content), a SLIDELINE™ blueprint (e.g., a blueprint in which a user is advanced through a series of related content items), video blueprint, glossary blueprints, and assessment blueprints. However, in some embodiments, the table of contents may instead be automatically and/or dynamically generated for the electronic book. Blueprints may contain links to other media files such as images, videos, audio, and the like to complete the presentation.

In some examples, media cards may be organized into chapters and all chapters may be organized into units, and so on. Each chapter may consist of primary cards (generally reading cards that correspond with sections from the main text) and embedded cards (image figures and other reading cards that are linked to from the primary cards). Embedded cards may be included as children of the parent card. Other linear and non-linear structures may be represented depending on the application. Blueprints may be platform-agnostic, as already explained; however, both the various included media and the blueprint may be adjusted by the content service to adjust for different device characteristics. Thus, for example, even if the media capabilities of two different devices are different, the blueprint will be adjusted for each platform so that the layout is correct across both devices.

Cards created from the blueprints may contain one or more links to other cards and other content including other reader cards, other image figure cards, etc. In some examples, the electronic book presented on the electronic reader device does not need to be linearly organized into the traditional book concepts of chapter, section, page, etc. In some examples, other links take users to a glossary, more in-depth coverage of a topic, or manipulable images which allow a user to zoom, rotate, or pan. In some examples, the table of contents contains links to all other cards in the book.

Execution Environment and Electronic Reader

The execution environment takes the platform-independent digital specification and the media and presents it to the user. The execution environment allows for user interactions with the presented content. As used herein, the term "present" includes at least the displaying or playing of audio, visual, and audio-visual content. The content includes text, graphics, images, video, sounds as well as the manipulation of and interaction with that content by an end user.

In some examples, the execution environment also connects to the content service and requests a web page or listing of available electronic books to download or otherwise authorize. In some examples, this functionality may include an electronic book or media marketplace where such media is available for purchase. The store may include search capabilities, personal recommendations, user ratings, and other features. In some examples, the store may present a list of the required textbooks for courses in which a user is enrolled. Each item may also show related content such as supplements and other learning aids related to the electronic book. In some examples, purchases may be made with a credit card, with or without a user opening an account with the store. In other examples, the store accounts may be linked with, or use, other accounts, such as an iTunes account run by Apple®, Inc., or an Amazon.com account. These accounts may save users' purchasing information.

Figure 3:
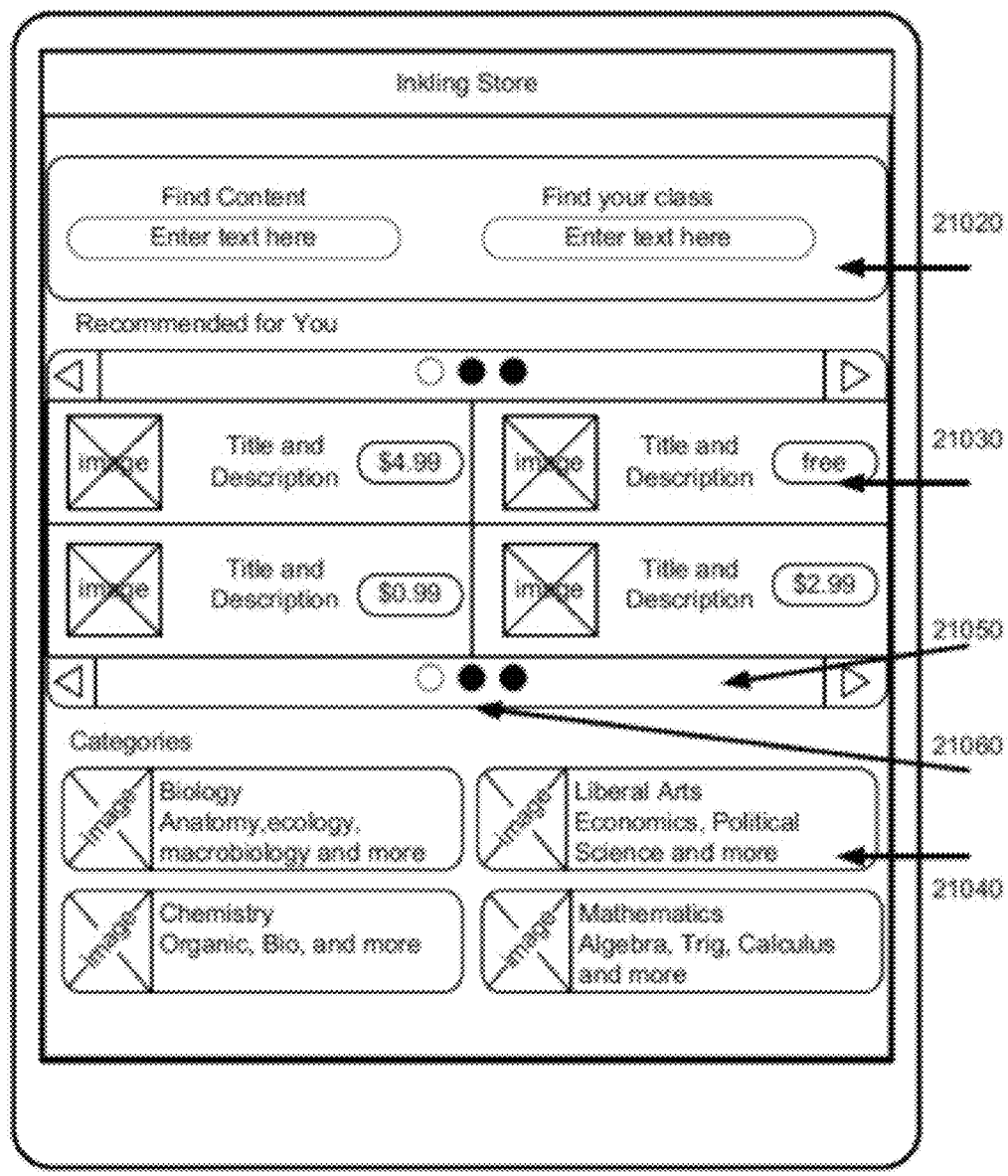
FIG. 3 shows an electronic bookstore according to some examples of the present disclosure.

In some examples, the store may be an online merchant store residing on the content service. In other examples, the store may be an application on the electronic reader where the application communicates with the server infrastructure to ascertain the server's current inventory. In still other examples, the store is run by a third party server such as iTunes, any application store, and the like. One example store is shown in FIG. 3. Reference numeral 21020 shows a header with search boxes. Reference numeral 21030 shows personalized recommendations, and reference numeral 21040 shows various categories of electronic books. Various navigation elements such as scrollbars 21050 and page indicators 21060 are also shown.

Figure 4:
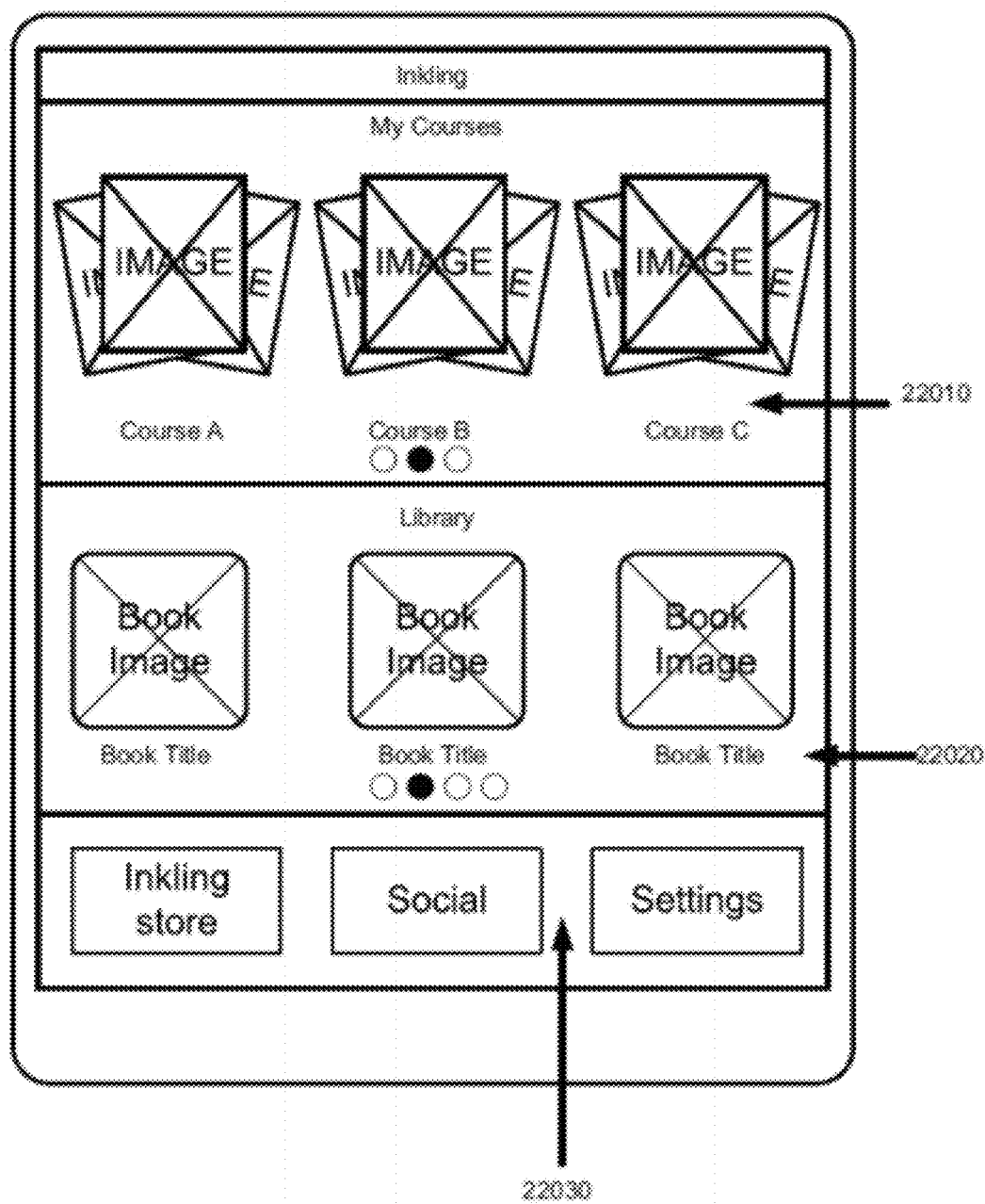
FIG. 4 shows a home screen according to some examples of the present disclosure.

In some examples, the execution environment provides the user with a way to organize already purchased media in any manner, such as according to courses, topics, books, materials, or the like. For example, FIG. 4 shows an example of an execution environment. Reference numeral 22010 identifies 3-dimensional thumbnails of the various "stacks" of cards making up material for various courses in which the user is enrolled. Reference numeral 22020 identifies the various books in the user's digital library (e.g., the books the user owns or has access to). The material for the various courses may include the user's current assignments for a particular period. Thus if the user is to read chapter 20 in the electronic book and do certain supplemental problems, the cards for chapter 20 and the supplemental problems may appear on the "stack" in section 22010. Reference numeral 22030 illustrates other user navigation aids to access the bookstore, settings, and various social features. When a course or textbook is selected, various animations may provide feedback to the user on the selection. For example, if one of the various stacks of cards is selected from the course materials section 22010, the stack may graphically "expand" and allow a user to scroll through thumbnail images of the various media in the stack. Thus for example, if the stack includes a portion of an electronic book as well as other supplements, the user may select which media content to view.

Additionally, the execution environment may present the user with updates available for any of the various books available in the user's digital library. In some embodiments, when the execution environment connects with the content service, the content service may provide a notification to the user on the user device indicating that one or more of the user's electronic books may be updated to a more current version. For example, the notification may be in the form of an icon indicating available updates or in the form of a pop-up notification. The notification may also be in the form of an email to the user, a text message, an instant message, or the like. In some embodiments, the user may initiate the update by sending a request to update content to a newer version. In some embodiments, the content service may send updated content to the user device automatically. For example, the content service may automatically update the content on the user device when the update becomes available for download, including real-time automatic updating (e.g., when content in an archive has changed). In some embodiments, the user may access the settings feature to select the manner in which the user receives updates to content. In some embodiments, a user may be asked to purchase an update. In other embodiments, the updates may be free (e.g., included with the initial purchase of the contents).

Figure 5:
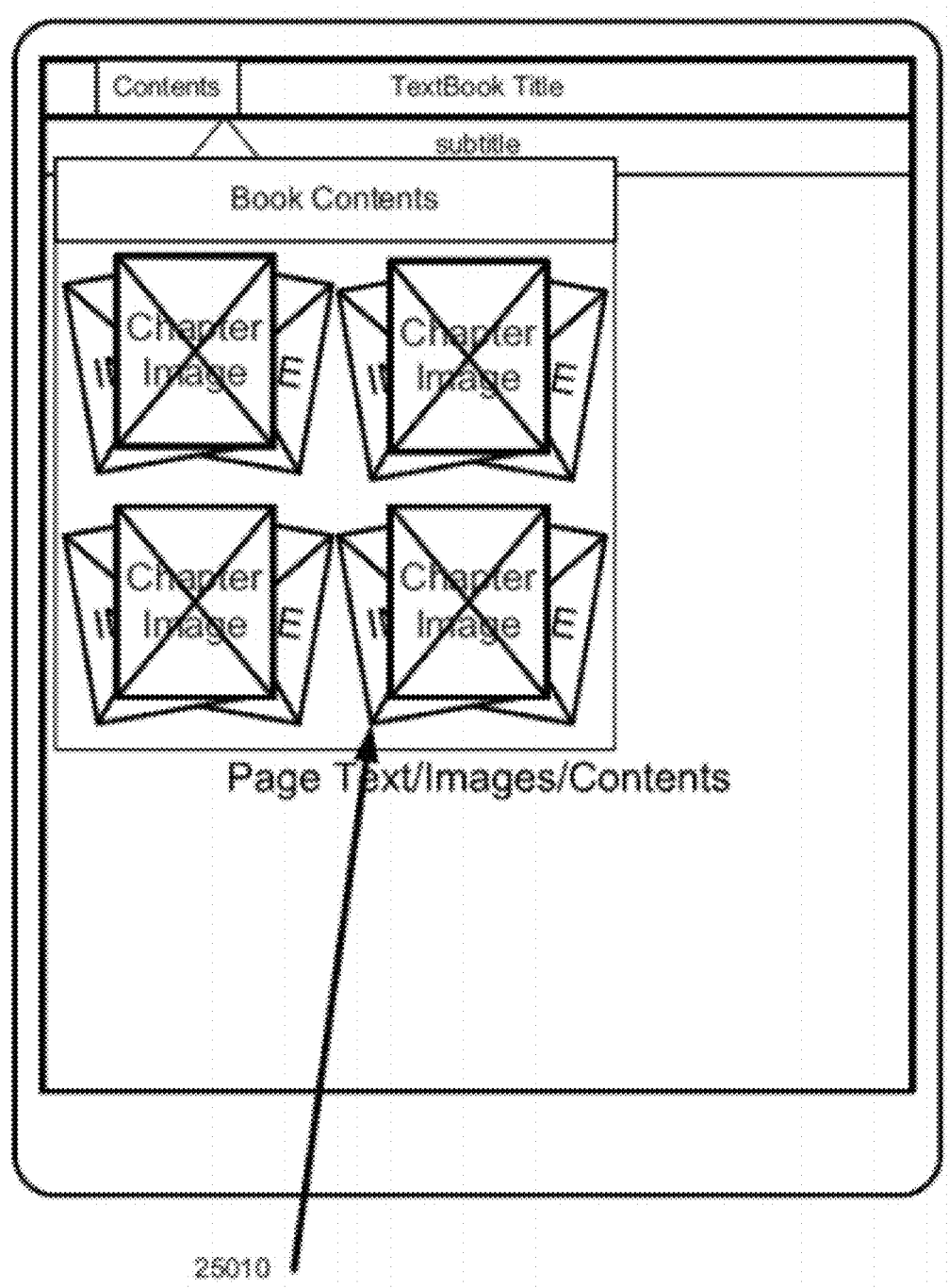
FIG. 5 shows an example of a navigation type according to some examples of the present disclosure.

Within an electronic book, the execution environment presents the user with various navigation aids. In some examples, the electronic book allows users to view thumbnail images from various sections of the electronic book. In other examples, the execution environment allows the user to view the titles from various sections of the book. In other examples, the electronic book presents a "virtual spine," which allows a user to see their relative location in the electronic book. In other examples, the electronic book may provide a navigation aid to show a user his or her assignments for the course in a drop down box. This allows a user to quickly jump to other assignment cards in the stack. FIG. 5 shows some examples of thumbnail navigation 25010 of book sections including chapters, sections, and the like.

In some examples, the execution environment receives and processes input from the user and changes the content presentation in a predefined manner. In some examples the user input includes touches, gestures, keyboard inputs, mouse inputs, trackball inputs, accelerometer or other motion inputs, speech inputs, and the like. Gestures are short, directional movements made by a finger, hand, stylus or other object to make a short, directional movement over a control or object on the screen. In some example, a user is allowed to take and share with other users notes relating to various portions of the book. In other examples, a user may easily navigate through a series or "stack" of cards by flipping or scrolling through a column view.

Figure 6:
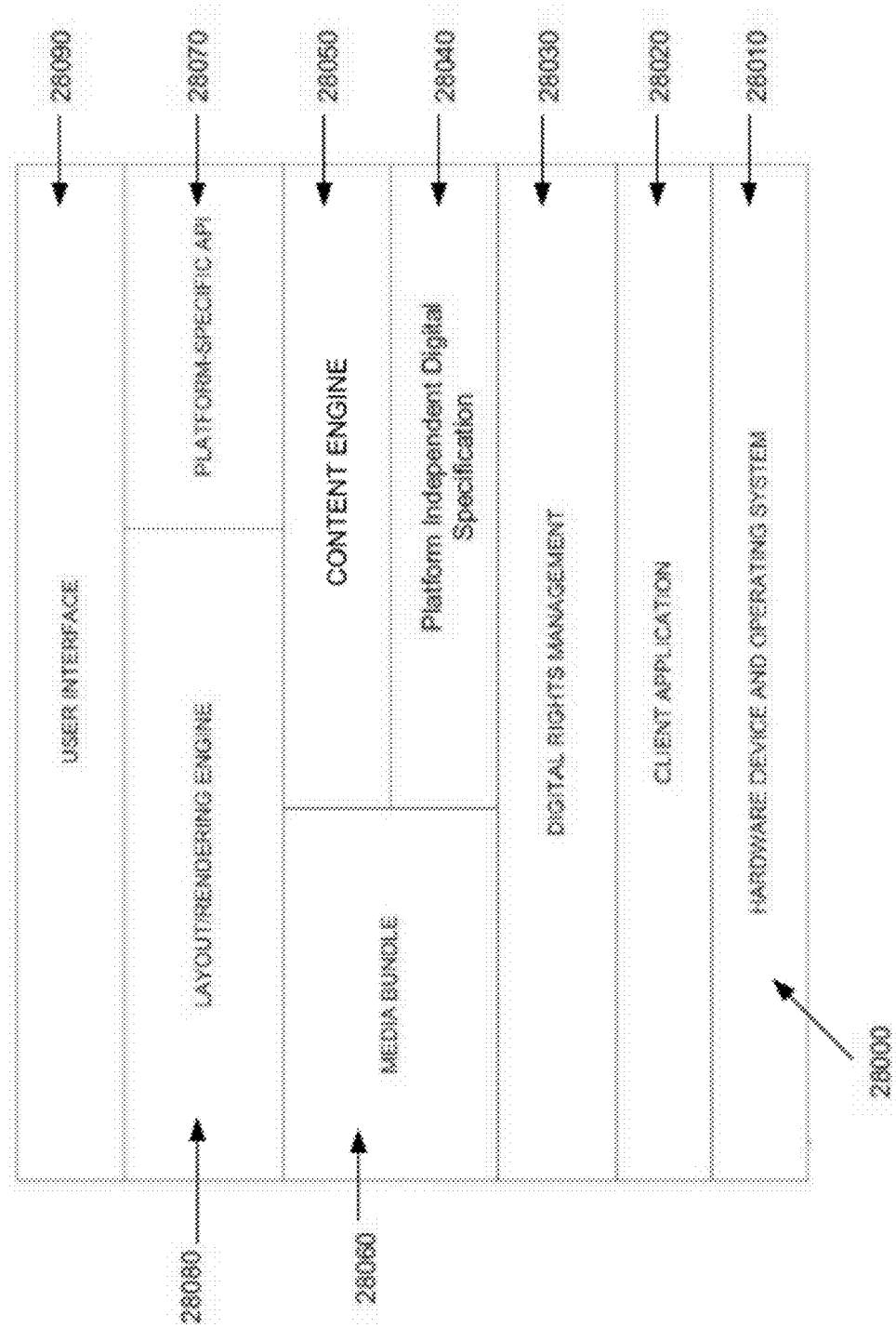
FIG. 6 is a block diagram illustrating an execution environment according to some examples of the present disclosure.

FIG. 6 shows an example system 28000 for an execution environment. In FIG. 6, hardware device and operating system 28010 are shown. Hardware device and operating system 28010 may be dependent on the particular type of electronic reading device. The hardware and operating system layer provide the functions for running application software, including the processor, system memory, storage, network interface, TCP/IP stack or other protocol stack, and application programming interfaces for the development of software applications. The hardware device and operating system may be of any variation including traditional PC-based operating systems, mobile device operating systems or network-based operating systems that abstract the hardware layer from the application programming interface. Some examples include Microsoft Windows, developed by Microsoft, Corp., Redmond, Wash., UNIX, LINUX, iOS™, MacOS™, Android™, and the like.

Client application 28020 represents the user-level executable the user launches on the client device in order to access the electronic book. In some embodiments, the client application 28020 may be configured to handle events such as multi-finger touch inputs to determine the appropriate behavior of the object on the screen. In some embodiments, all functions of FIG. 6 may be inside the client application. In other examples, only selected portions are encapsulated in client application 28020.

In some examples, digital rights management process 28030 or "DRM" process authorizes and authenticates a particular user or device in order to allow the user to access appropriate media from the electronic book. DRM may authorize an entire book, or selected portions thereof. DRM also prevents the user and device from accessing electronic books or segments thereof that the user is not authorized to access. In some examples, DRM may also be configured to prevent a user or system from extracting text, images, video or other protected assets, and transmitting those assets to another device or writing them out to disk for later retrieval or sharing.

Platform independent digital specification 28040 provides a platform-agnostic representation of all content and metadata for that content. Metadata may include basic information such as the date content was created and/or modified, the version number, and where the content should appear in the context of its bundle. Metadata may also include descriptions of interactive behavior, such as, for example, where audio annotations would be anchored on an image when it rendered in the system, or how an image might be positioned initially on the screen when a user opens it.

Content engine 28050 is configured to interpret the intermediate platform-independent digital specification and read data from the media bundle 28060, providing it in a platform-specific representation to the layout/rendering engine 28080 and the platform specific API 28070. Platform specific API 28070 is configured to accept data from the content engine 28050 and media bundle 28060 and determine the appropriate objects to instantiate in order to display the content to the user. The layout/rendering engine 28080 works in parallel with the platform specific API 28070 to render that content to the display. The user interface 28090 is a collection of canonical visual elements that provide the user with known results to input behaviors. For example, the user interface 28090 may be configured to render a small "sticky note" that shows that a given location in a document and has an annotation attached.

The execution environment runs on an electronic reader. In some examples, the electronic reader may be an iPad manufactured by Apple®, Inc. of Cupertino, Calif., or another tablet computer or electronic reader such as a Nook, manufactured by Barnes and Noble, Inc. of New York, N.Y. or Kindle, manufactured by Amazon.com of Seattle, Wash., and the like. In some other examples, the electronic reader may be a laptop, tablet, or desktop computer. In other examples, the electronic reader may be a cellphone or smartphone such as the Apple® iPhone™ manufactured by Apple® Inc., of Cupertino, Calif. The electronic reader may be any device with a display, an input mechanism, a processor, and electronic storage.

Figure 7:
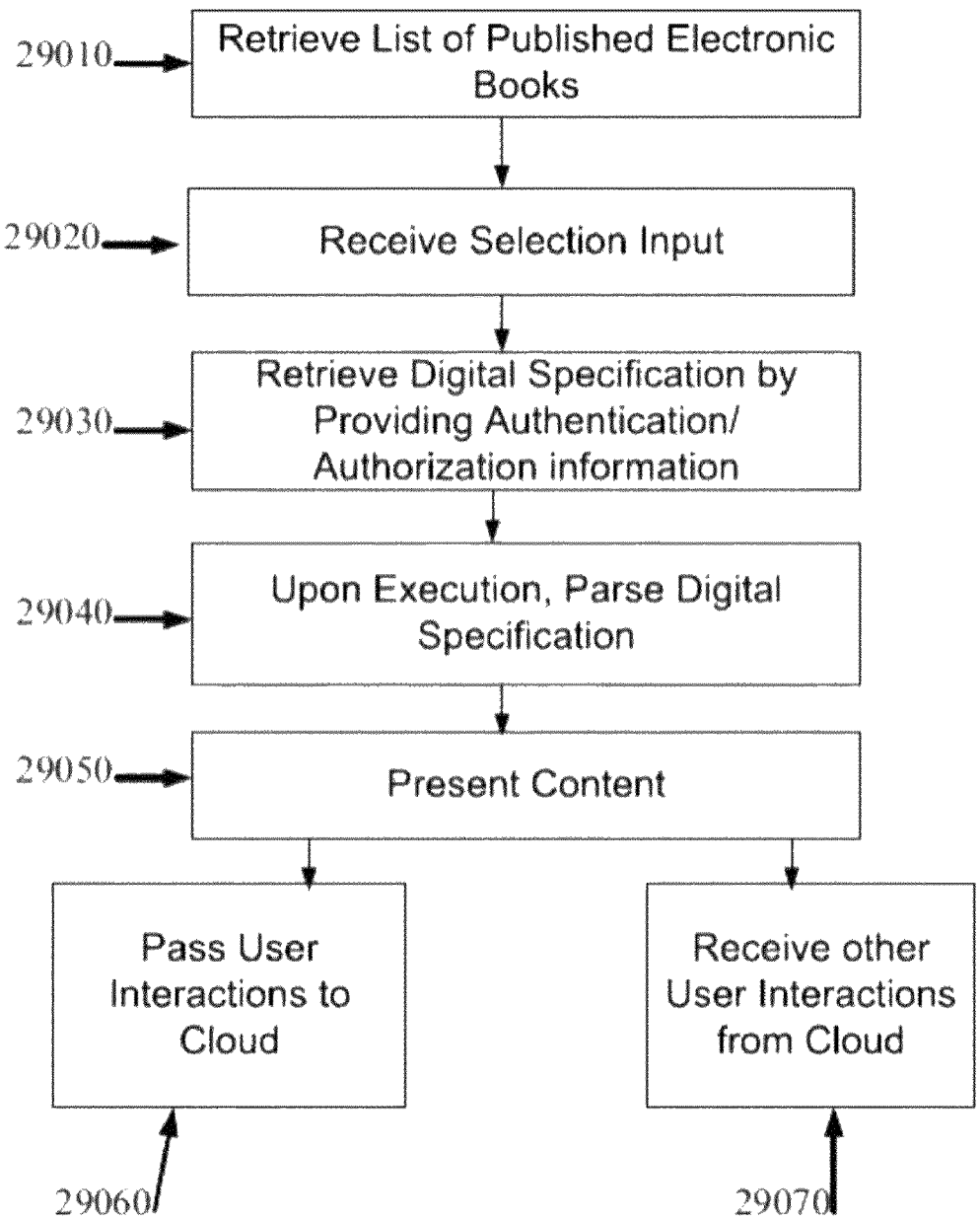
FIG. 7 is a flow chart showing an example method of the execution environment according to some examples of the present disclosure.

FIG. 7 shows an example method of execution of an electronic reader. In operation 29010, the electronic reader retrieves a list or web page with a list of published electronic books and presents that list or web page to a user. In response to a selection input 29020, the reader retrieves the electronic book by authentication. When the user executes the electronic book 29030, the platform independent digital specification is parsed 29040 and the contents presented 29050. Any user interactions that are social in nature are passed to the content service 29060, and the reader presents to the user any interactions passed from the content service 29070. As used herein, the term "published," or "publication," simply refers to the availability of a particular electronic book to users of electronic reading devices.

Figure 8:
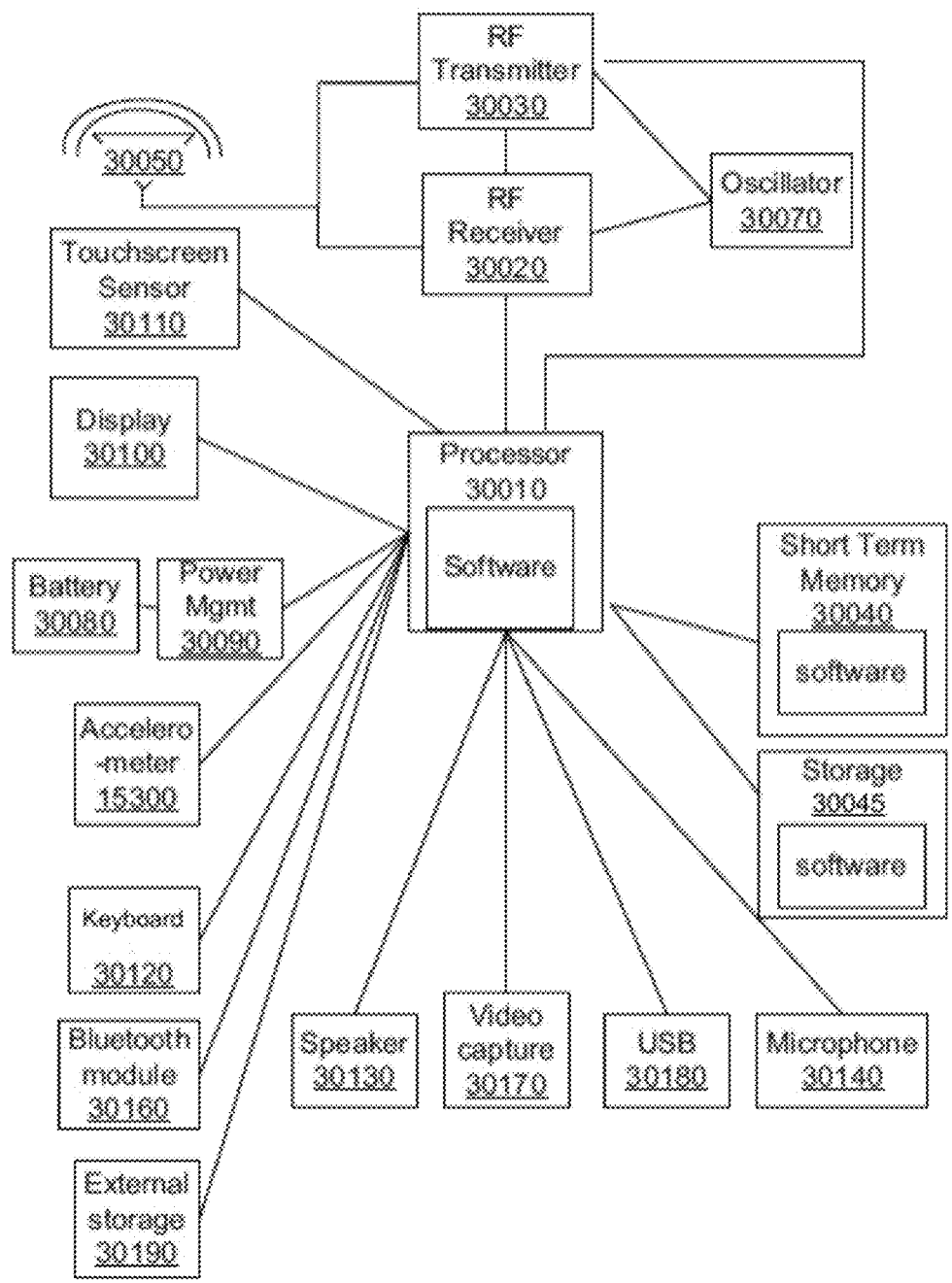
FIG. 8 shows a block diagram of an example electronic reader according to some examples of the present disclosure.

FIG. 8 shows some examples of such a device in the form of a tablet computer. Processor 30010 controls the overall functions of the tablet such as running applications and controlling peripherals. Processor 30010 may be any type of processor including RISC, CISC, VLIW, MISC, OISC, and the like. Processor 30010 may include a digital signal processor (DSP). Processor 30010 may communicate with RF receiver 30020 and RF transmitter 30030 to transmit and receive wireless signals such as cellular, Bluetooth, and Wi-Fi signals. Processor 30010 may use short term memory 30040 to store operating instructions and help in the execution of the operating instructions such as the temporary storage of calculations and the like. Processor 30010 may also use non-transitory storage 30045 to read instructions, files, and other data that requires long term, non-volatile storage.

RF receiver 30020 and RF transmitter 30030 may send signals to the antenna 30050 of display 30100. RF transmitter 30030 contains all the necessary functionality for transmitting radio frequency signals via antenna 30050 given a baseband signal sent from processor 30010. RF transmitter 30030 may contain an amplifier to amplify signals before supplying the signal to integrated antenna 30050. RF transmitter 30030 and RF receiver 30020 are capable of transmitting and receiving radio frequency signals of any frequency including, microwave frequency bands (0.3 to 300 GHz) which include cellular telecommunications, WLAN and WWAN frequencies. Oscillator 30070 may provide a frequency pulse to both RF receiver 30020 and RF transmitter 30030.

Device 30000 may include a battery or other power source 30080 with associated power management process or module 30090. Power management module 30090 distributes power from the battery 30080 to the other various components. Power management module 30090 may also convert the power from battery 30080 to match the needs of the various components. Power may also be derived from alternating or direct current supplied from a power network.

Processor 30010 may communicate and control other peripherals, such as LCD display 30100 with associated touch screen sensor 30110. Processor 30010 causes images to be displayed on LCD display 30100 and receives input from the touchscreen sensor 30110 when a user presses on the touchscreen display. In some examples touchscreen sensor 30110 may be a multi-touch sensor capable of distinguishing and processing gestures.

Processor 30010 may receive input from a physical keyboard 30120. Processor 30010 may produce audio output, and other alerts which are played on the speaker 30130. Speaker 30130 may also be used to play voices (in the case of a voice phone call) that have been received from RF receiver 30020 and been decoded by processor 30010. Microphone 30140 is used to transmit a voice for a voice call conversation to processor 30010 for subsequent encoding and transmission using RF transmitter 30030. Microphone 30140 may also be used as an input device for commands using voice processing software. Accelerometer 15300 provides input on the motion of the device 30000 to processor 30010. Accelerometer 15300 may be used in motion-sensitive applications. Bluetooth module 30160 may be used to communicate with Bluetooth enabled external devices. Video capture device 30170 may be a still or moving picture image capture device or both. Video Capture device 30170 is controlled by processor 30010 and may take and store photos, videos, and may be used in conjunction with microphone 30140 to capture audio along with video. USB port 30180 enables external connections to other devices supporting the USB standard and charging capabilities. USB port 30180 may include all the functionality to connect to, and establish a connection with an external device over USB. External storage module 30190 may include any form of removable physical storage media such as a flash drive, micro SD card, SD card, Memory Stick and the like. External storage module 30190 may include all the functionality needed to interface with these media.

The Infrastructure

Content service 1010 (FIG. 1), in some examples, includes data storage, authentication and authorization services, social networking services, content ingestion, listing and publishing services and bundling services. One example interactive content service 31000 is shown in FIG. 9.

Figure 9:
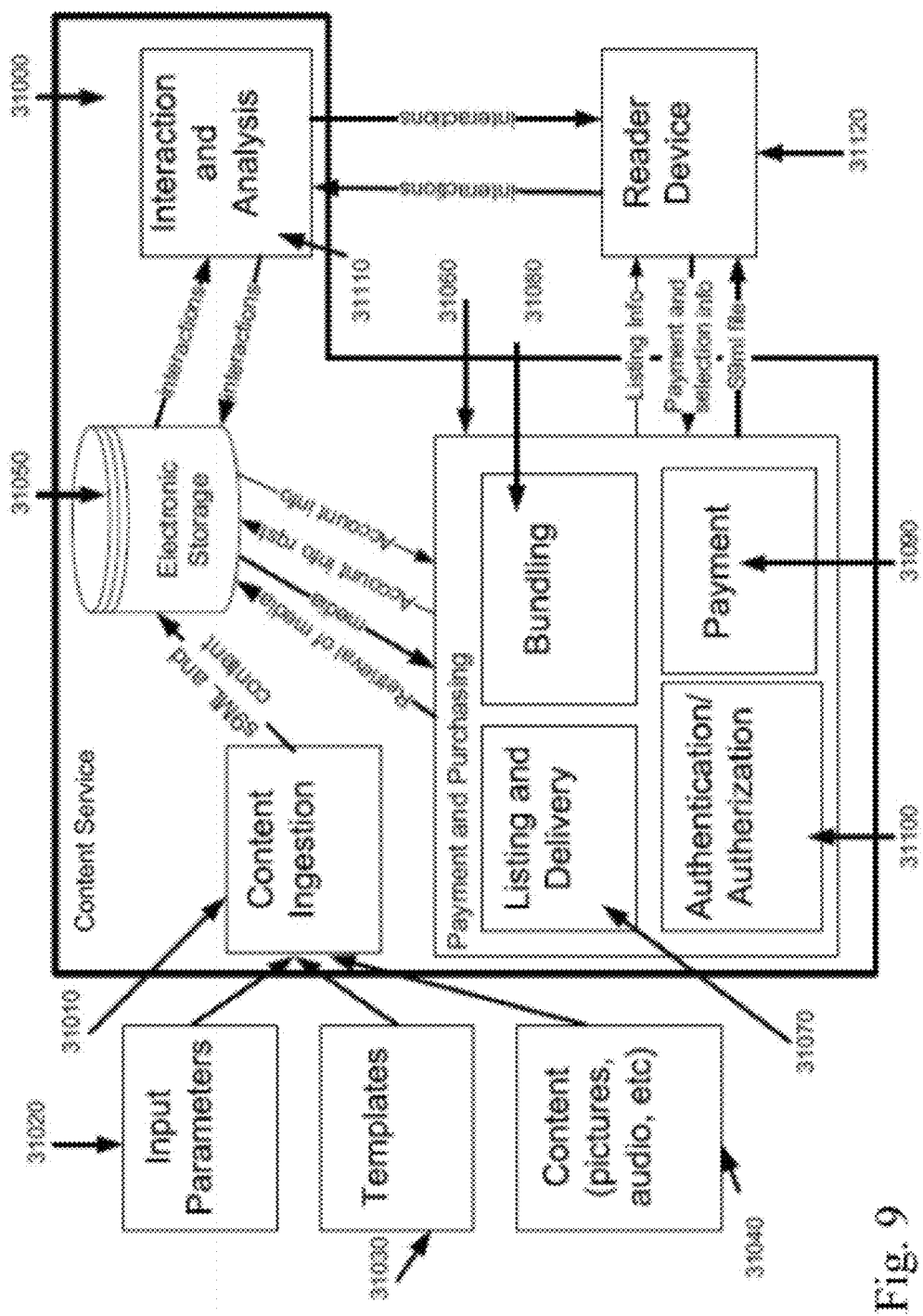
FIG. 9 shows a block diagram of an example interactive service according to some examples of the present disclosure.

In FIG. 9, content ingestion module 31010 takes platform-independent resources such as input parameters 31020, templates 31030, and content 31040 and creates a platform-dependent digital specification of an electronic book. The input parameters 31020, templates 31030, and content 31040 may be provided by content creators. The platform-dependent digital specification may be in any format which an execution environment of an electronic reader may read, interpret, and process in order to display the content presentation items of the electronic book. The platform-dependent digital specification may also include parameters for any various interactive content presentation objects that tell the execution environment how to handle user interaction. In some examples, the platform-dependent digital representation may be one or more s9mL files, which in some examples may be an XML, HTML, or other markup language file according to a defined structure.

The content ingestion module 31010 may create the platform independent digital specification of an electronic book by using the input parameters 31020, templates 31030, and content 31040 to create one or more files which make up the platform independent digital specification. The files may be any files created or compiled using source material of the content which may be provided by content creators or by the content service 1010 (FIG. 1). For example, a file may include an image file, an image file plus related assets (e.g., media, audio, 3-dimensional model data, etc.), or an HTML file or XML file plus any metadata for resizing the content for different electronic reader devices. In some embodiments, the content ingestion module 31010 may organize the files which make up the platform independent digital specification into one or more archives. The archives for files may be organized in any manner. For example, the files in an archive may include files for a particular chapter of the electronic book. In other examples, an archive may include files for a particular section or a particular unit of the electronic book.

The content ingestion module 31010 may store the generated platform independent digital specification in electronic storage 31050. Electronic storage 31050 may be any electronic storage capable of storing and retrieving the digital specifications and the media. In some examples electronic storage 31050 is a separate system such as a network attached storage (NAS) or storage area network (SAN) system.

Payment and purchasing module 31060 may be capable of handling advertising of the availability of a particular electronic book stored in electronic storage to a plurality of reader devices 31120. In some examples, payment and purchasing module 31060 may communicate the availability of titles directly to the electronic readers either by pushing the availability information to the execution environment of the readers (which may have a marketplace application executing) or by allowing the reader to request the information through, for example, a web interface. Thus, in some examples, the payment and purchasing module 31060 may function as a web server, and in other examples it may function as a data source for a store application on the reader device 31120 itself. In still other examples, payment and purchasing module 31060 may communicate title availability to a third party web merchant site, such as Amazon, iTunes or the iPhone App Store.

Payment module 31090 may process payments from reader devices. In some examples, this may include credit card processing functions. In other examples, this includes electronic payment interfaces to third party applications such as that of PayPal, run by eBay, Inc. of San Jose, Calif. In some examples, payment module 31090 may maintain a credit or debit account for the user of the reader device 31120.

Authentication and authorization module 31100 may be capable of authenticating a reader device 31120 and authorizing the reader device 31120 to view the requested content. In some examples, the electronic book may contain digital rights management software. The authentication and authorization module 31100 may work with the digital rights management of the electronic book or the digital rights management of the electronic reader to authorize the user to access the content. In some examples, the authentication and authorization module 31100 works with the payment module 31090 to authenticate and authorize the content only after payment is verified or received.

Once the content is paid for, authenticated, and authorized, listing and delivery module 31070 delivers, or makes available for delivery, the electronic book or a portion thereof. In some examples, the reader device 31120 downloads the platform independent specification. In other examples, the platform independent specification is streamed as the user is viewing the content. In yet other examples, the listing and delivery module 31070 informs a third party content storage facility to deliver, or authorize the delivery of, the content. In other examples, listing and delivery module 31070 may deliver or make available for delivery, updates to the electronic book or a portion thereof.

In some examples, the electronic book may be tagged by the chapter, sentence, paragraph, word, or any arbitrary segment. In some examples, users may purchase only certain portions of the electronic book based on this tagging. Dynamic sequencing is discussed in detail in U.S. patent application Ser. No. 12/911,247 entitled "Methods for sequencing electronic media content," to Peter Cho, which is hereby incorporated by reference in its entirety. In other examples, these tags are used to share social content interactions. Bundling application 31080 uses these tags, along with information on which portions of the electronic book to send to the reader device 31120, to bundle all the proper content together so it can be sent to the reader device 31120, rather than sending the entire electronic book.

Interaction and analysis module 31110 receives, processes, stores and sends to other reader devices interactions from users. These interactions may include, in some examples, user comments relating to a portion of the electronic book, user questions, or any other interactions. In some examples, the interactions may be text, in other examples it may be any combination of text, graphics, photos, HTML links, or the like. Interactions may also include, in some examples, interactive bookmarks to share a particular user's location in the content with other content users. Other interactions may include highlighting, which shares a particular user's highlighting choices with other users. Interaction and analysis module 31110 also receives assessment results from the electronic readers. Interaction and analysis module 31110 may then provide various reports about the test performance of a particular user and about all users who submitted results. These reports may include reports on how well an assessment is designed and may be intended for the content designer. For example, if most individuals performed extremely well, it signals that the assessment may have been too easy. Other reports include reports sent to users who have completed assessments showing their results, as well as showing results of other users who have completed the assessments. These reports may be made anonymous so that users may not directly see other user's scores. In some examples, only an average score will be shown. In other examples a ranking may be shown to indicate where a particular user is with respect to other users.

It will be appreciated that the components inside the content service 31000 could be implemented as separate components, or those components not shown as part of content service 31000 could be included as part of content service 31000. Additionally, the various components could be executing on the same hardware, or on different hardware connected through a computer network. In some examples, this computer network may include LAN, WAN, the Internet, Wi-Fi, Wi-Max, cellular, and any other method of data transmission. In some other examples, different hardware components may be connected through local connections such as fiber, Ethernet, serial, parallel, PS2, USB, wireless, infrared, FireWire or the like. Electronic reading devices 31120 may communicate with the content service 31000 through direct connections such as USB, Ethernet, serial, parallel, PS2, USB, wireless, infrared, FireWire, or the like. In other examples, electronic reading devices 31120 may communicate with the content service 31000 through a computer network. In some examples, the reader devices access the computer network through wired connections such as USB, Ethernet, FireWire, or the like, but in other examples, the reader devices may access the computer network through wireless means such as Wi-Fi, Bluetooth™, satellite, cellular data communications including but not limited to analog, digital, 2nd Generation (2G) systems such as Integrated Digital Enhanced Network (iDEN), Global System for Mobile Communications (GSM), 2.5G systems such as General Packet Radio Service (GPRS), 2.75G systems such as Enhanced Data Rates for GSM Evolution (EDGE), 3G systems such as Universal Mobile Telecommunications System (UMTS), and 4G Systems such as the Worldwide Interoperability for Microwave Access (WiMAX), and Long Term Evolution (LTE) systems, and the like.

While the digital specification is sent unchanged, in some examples, to the reader device 31120, in other examples, minor modifications are made depending on the device type. This is because there may be little benefit in sending a high-resolution image to a reader device 31120 that is a cellphone which is incapable of rendering such a high-resolution image. Thus, to better put the electronic book in a form ready for presentation, the content service may modify the content according to the target reader device 31120.

Updating Content

Figure 10:
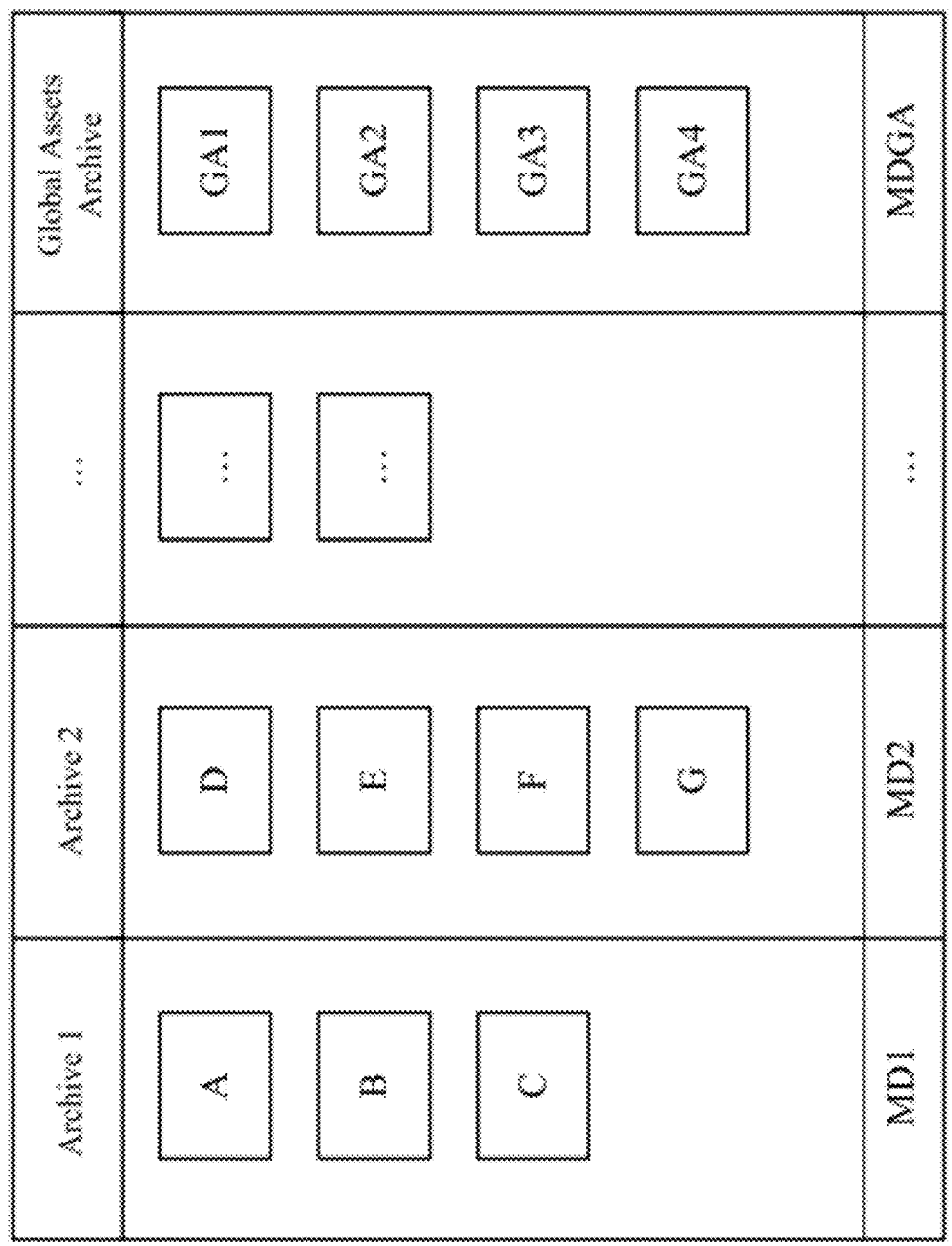
FIG. 10 shows a block diagram of an example archive architecture associated with content according to some examples of the present disclosure.

FIG. 10 shows a block diagram of an example archive architecture of the digital specification. Although the example archive architecture will be explained in the context of updating contents for electronic reader device 31120 (FIG. 9), similar archive architectures and updating processes may be used for any type of content (e.g., updating source files, updating videogames, etc.). The archives of files may be stored in the electronic storage 31050 of the content service 31000 (FIG. 9). An electronic book may have any number of archives for organizing files for content of the electronic book. As previously described, the archives may be organized in any manner, such as by chapter, unit, section, etc. For example, Archive 1 may include files for chapter 1 of an electronic book, and Archive 2 may include files for chapter 2 of an electronic book. In some embodiments, an archive may be stored in the electronic storage 31050 (FIG. 9) as a compressed file (e.g., a zip file or a tar file).

The files within an archive may include any files for displaying the content on the user device, including files for the content itself. Examples of types of files within the archive include, but are not limited to, graphics, figures, audio, text, videos, tables, slideshows, interactive content presentation objects, interactive assessment objects, or any other files for content belonging in the archive. Additionally, a file may be a data file containing information about header displays (e.g., color, font, style, etc.) or information about the arrangement of the content on the user device (e.g., information about how the content should be organized and displayed on the user device). Each file may be associated with a path indicating the location at which the file is stored. An archive may have any number of files within the archive. In the example depicted in FIG. 10, Archive 1 includes files A, B, and C, Archive 2 includes files D, E, F, and G, and the Global Assets Archive includes files GA1, GA2, GA3, and GA4.

The archives may include metadata associated with the files in the archive. The metadata may include any information about the files in the archive, including a list of the files stored in the archive, version information for each of the files in the archive, data about the order of the files within the archive, etc. The metadata for each of the files may be stored in the order in which each of the files was created and/or last modified. In the example of FIG. 10, the metadata for Archive 1 (MD1) may show that the order of the files is A, B, C, with file A being created and/or modified first, file B being created and/or modified second, and file C being created and/or modified last. The metadata for Archive 2 (MD2) may show that the order of the files is D, E, F, G, with file D being created and/or modified first, file E being created and/or modified second, file F being created and/or modified third, and file G being created and/or modified last. The metadata for the Global Assets Archive (MDGA) may show that the order of the files is GA1, GA2, GA3, GA4, with file GA1 being created and/or modified first, file GA2 being created and/or modified second, file GA3 being created and/or modified third, and file GA4 being created and/or modified last.

In some embodiments, a file in an archive may reference another file also within the same archive by calling the path for the referenced file. For example, file A may be an image that may be loaded by HTML file B. In some embodiments, content in a particular archive may also be used in another archive. For example, an image may appear in Archive 1 (e.g., chapter 1) of an electronic book and may appear again in Archive 2 (chapter 2) of the book. In some embodiments, although the content of the image file is the same in both archives, a file for the image may be stored in both Archive 1 and in Archive 2 so that the archives can function independently from the other archives. This may also facilitate the delivery of only a portion of an electronic book to a user device.

In some embodiments, the digital specification may also include a Global Assets Archive. The Global Assets Archive may include any files that may be used by any archive in the digital specification. For example, the Global Assets Archive may include files associated with the organization of the electronic book on the user device, the table of contents, index, and glossary for the electronic book, encryption keys, etc.

As explained above, the files in an archive may be organized in order of last creation and/or modification. For example, if file A in Archive 1 were modified, file A would move to the bottom of the list of files so that the order of the files becomes B, C, A. If a new file X were subsequently added to the Archive 1, that file would be added to the bottom of the list so that the order of the files becomes B, C, A, X. The data used to order the files within an archive may be managed by a centralized version control system for consistently maintaining a history of the source files for all files in a digital specification, which may include files upon which other files may be based. The version control system may create and maintain information about when each file in a digital specification was created and last modified. In some embodiments, the state or last modified time of the source material for each file may be used to maintain this information. For example, a file may be created using an HTML source file and a source file containing metadata associated with resizing information. If either (or both) of these source files is changed (e.g., an author submits a revision to a file), the state of the file as a whole may go up, indicating that the file as a whole was last modified. Each archive may use the information from the centralized version control system to manage and organize the files within the archive based on when each file was last modified. In some embodiments, a last modified time for each output file in the archive may be computed based on the information about the state of each input or source file maintained in the version control system and used to compile the file in the archive. The files in the archive may then be ordered based on the last modified time of each output file.

As described above, content may be delivered to a user device using the listing and delivery module 31070 (FIG. 9) of the content service 31000 (FIG. 9). When an electronic book (or any portion thereof) is initially downloaded on a user device, the entire contents of one or more archives associated with the material to be downloaded may be delivered to the user device. If one or more authors of the electronic book subsequently submits a revision to the content service 31000, the content service 31000 may allow delivery of the updated content by delivering only the portions of content that have changed, thereby avoiding the need to download the unchanged portions of content. The content service 31000 may determine the version of content residing on the user device. Using this information, the content service 31000 may access the archive for the version to which the content will be updated and perform a linear search through the archive. Since the files are ordered based on when each file was last modified, the content service 31000 may linearly search the archive metadata. When the content service 31000 finds a first file that is associated with a version of content that is newer than the version currently residing on the user device, the content service 31000 may deliver that file as well as any files ordered subsequently after the first new file in the list.

In some embodiments, a modification to files in an archive may cause changes in other files in other archives. For example, the addition of a file may result in a change in the table of contents. Thus, the archive containing the additional file may be used to update the file on the user device, and the Global Assets Archive may be used to update the table of contents on the user device.

Figure 11:
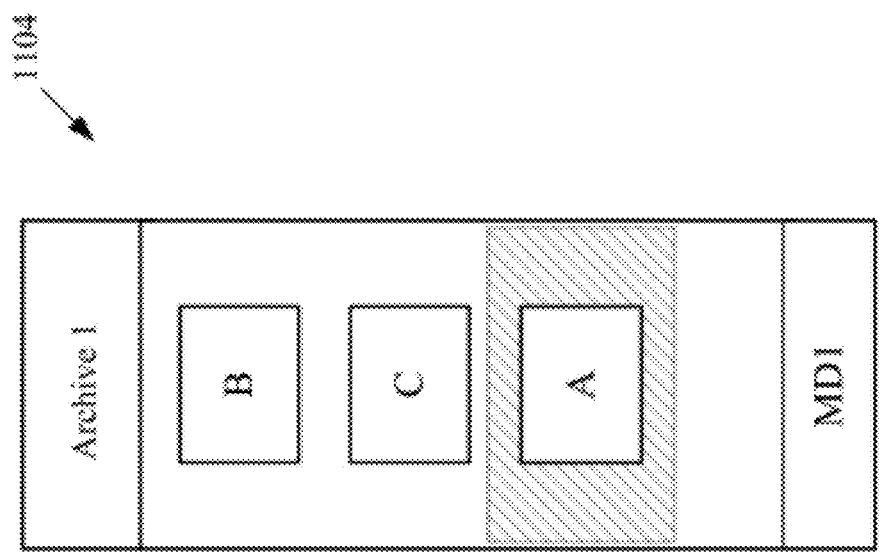
FIG. 11 shows block diagrams of example archives for a first version of content and a second version of content containing a modification of a file according to some examples of the present disclosure.
Figure 11:
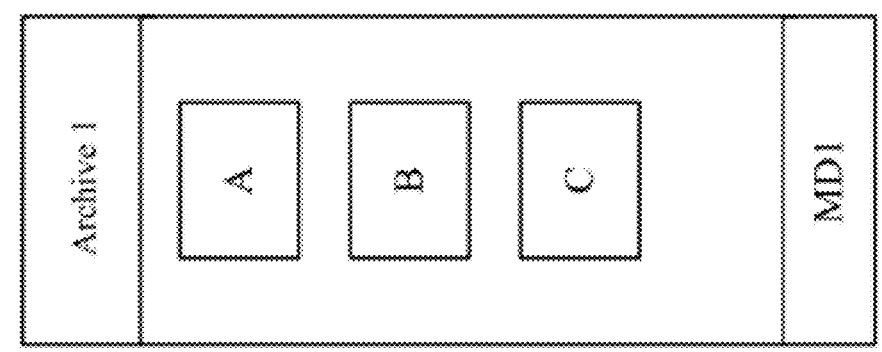

FIG. 11 shows block diagrams of example archives for a first version of content and a second version of content containing a modification of a file. The first version 1102 of Archive 1 includes file A, file B, and file C. Additionally, Archive 1 contains metadata MD1 which includes metadata associated with the archive and the files within the archive. When a content creator submits a revision to the first version 1102 of content (e.g., a correction to a typographical error made in the first version), a second version 1104 of Archive 1 may be created, which may include the updated content. Additionally, the metadata MD1 may be updated accordingly to reflect the changes made in the second version 1104.

In the example of FIG. 11, file A has been modified in the second version 1104 of the contents in Archive 1. File B and file C remain unchanged. Thus, the second version 1104 of Archive 1, the files may be ordered according to when the files were last modified (e.g., B, C, A). Additionally, the metadata MD1 for the second version 1104 may be modified to reflect this change. For example, the metadata may contain information about the new order of the files in the archive.

When the content is to be modified on the user device from the first revision 1102 to the second revision 1104, the content service 31000 (FIG. 9) may sequentially access version information for each file in the second version 1104 of Archive 1. In some embodiments, the second version 1104 of Archive 1 may be another set of files for that version. In some embodiments, the second version 1104 of Archive 1 may be the updated first version 1102 of Archive 1. The version information of each file may be included in the metadata MD 1 and may indicate the version in which the content was last created and/or modified. As the content service 31000 sequentially accesses this information for each ordered file, the content service 31000 may reach version information for a file that indicates a version that is newer than the version currently residing on the user device. The download may begin at that point in the second version 1104 of Archive 1.

For example, in the first version 1102 of Archive 1, files A, B, and C may be associated with version information indicating the first version of Archive 1. In the second version 1104 or Archive 1, files B and C may still be associated with version information indicating the first version of Archive 1. Since file A was modified in the second version 1104 of Archive 1, file A may be associated with version information indicating the second version of Archive 1 and reordered such that file A is at the bottom of the list of files in the metadata MD 1. When the content service 31000 (FIG. 9) performs the linear search of the second version 1104 of Archive 1, the content service 31000 may access version information for file B first (since it is at the top of the list) and may determine that file B is associated with version information indicating the same version (e.g., the first version 1102) residing on the user device, since file B did not change. The content service 31000 may then access version information for file C and may determine that file C is associated with version information indicating the same version (e.g., the first version 1102) residing on the user device, since file C did not change. The content service 31000 may then access version information for file A and may determine that file A is associated with version information indicating a version that is newer than the version residing on the user device (e.g., the second version 1104), since file A was modified in the second version of the content. The content service 31000 may then provide the modified file A to the user device so that the old file A residing on the user device may be replaced with the modified file A.

Figure 12:
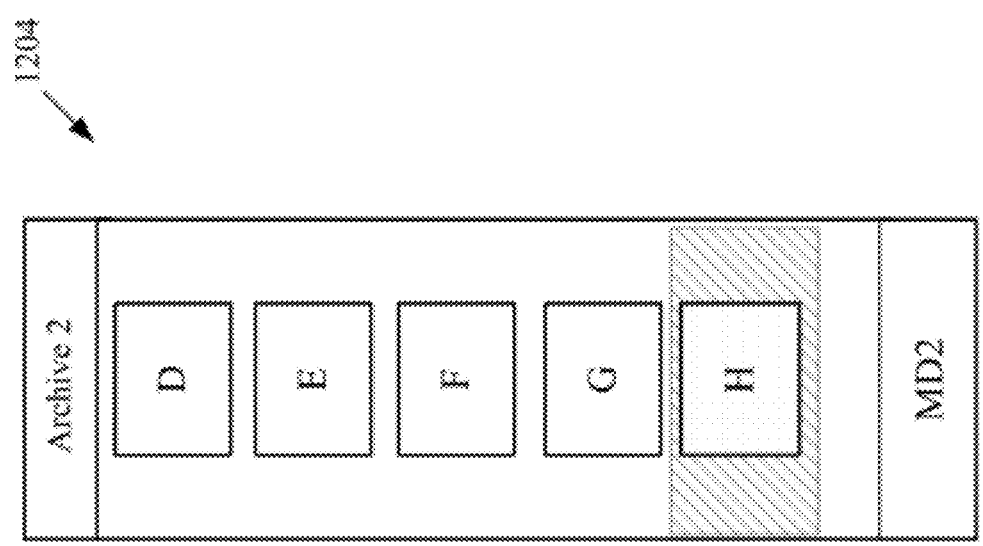
FIG. 12 shows block diagrams of example archives for a first version of content and a second version of content containing an addition of a file according to some examples of the present disclosure.
Figure 12:
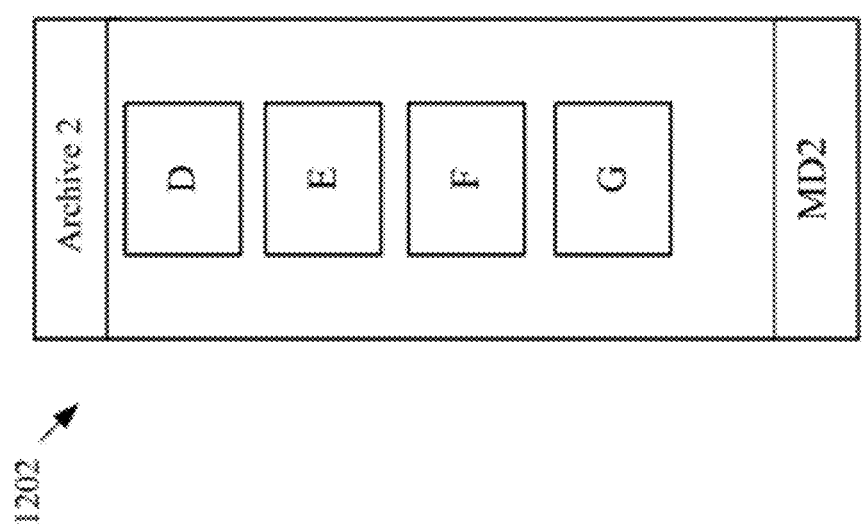

FIG. 12 shows block diagrams of example archives for a first version 1202 of content and a second version 1204 of content containing an addition of a file. The first version 1202 of Archive 2 includes files D, E, F, and G, each of which may be associated with version information indicating the first version 1202 in metadata MD2. When a content creator submits a revision which adds content to the electronic book (e.g., adding a figure to Chapter 2 of the electronic book), Archive 2 may be updated to include the additional content. In the example of FIG. 12, file H has been added so that the second version 1204 of Archive 2 includes file H ordered last in the list of files. MD2 may also be revised accordingly to reflect the addition of file H and its association with the second version 1204 of the content. In the second version 1204 of Archive 2, files D, E, F, and G may remain associated with the first version 1202.

When the first version 1202 of content residing on the user device is to be updated to the second version 1204 of content, the content service 31000 (FIG. 9) may determine that the user device contains the first version 1202. The content service 31000 may then access the second version 1204 of Archive 2 and perform a linear search of the archive. The content service 31000 may first access file D (since it is at the top of the list) and may determine that file D is associated with version information indicating the same version (e.g., the first version 1202) residing on the user device, since file D did not change. The content service 31000 may then sequentially perform a similar check for files E, F, and G. At file H, the content service 31000 may determine that file H is associated with version information indicating a version that is newer than the version residing on the user device (e.g., the second version 1204), since file H was added in the second version 1204 of the content. The content service 31000 may then provide the additional file H to the user device so that the new content may be displayed on the user device.

Figure 13:
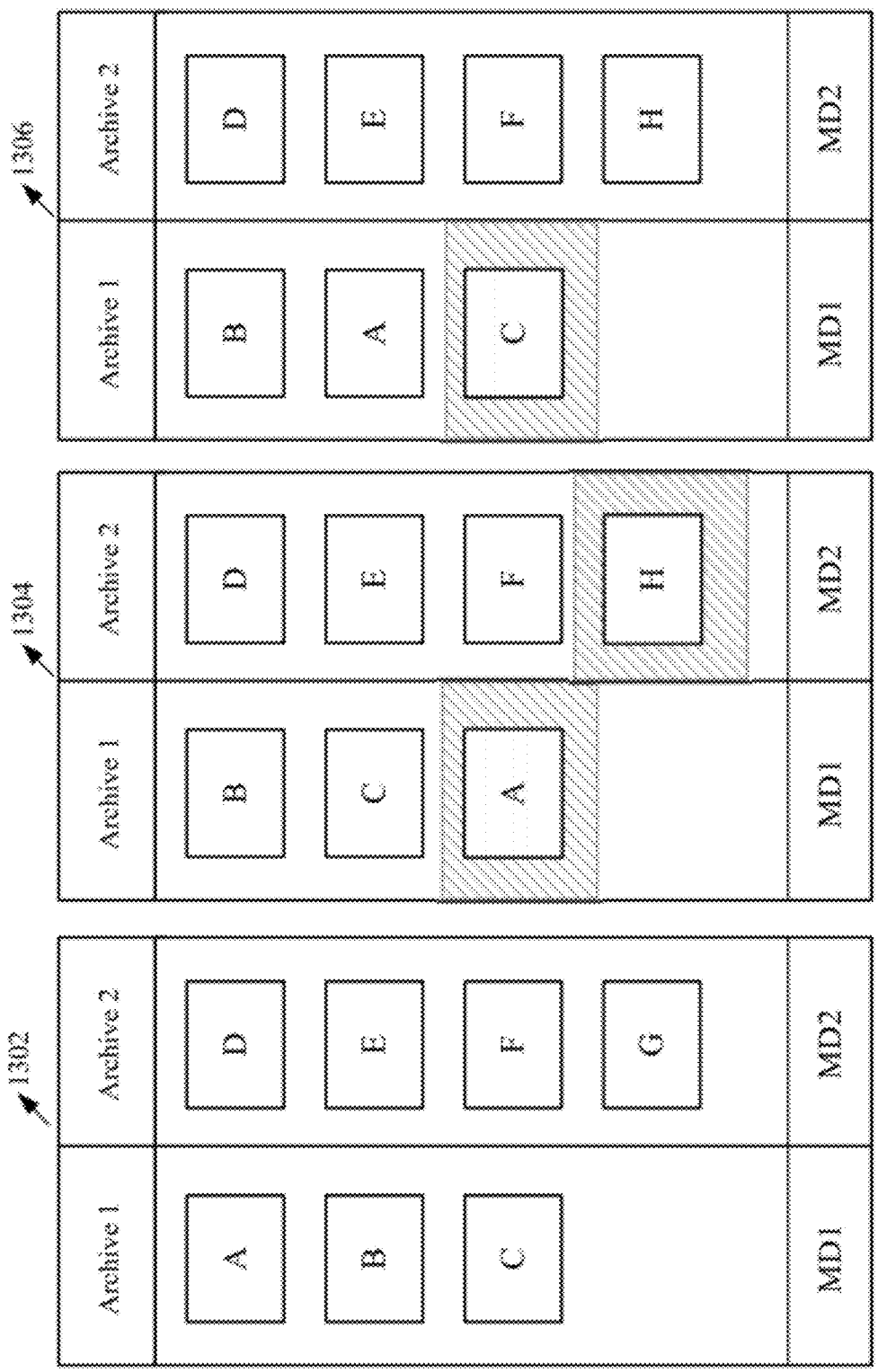
FIG. 13 shows block diagrams of example archives for a first, second, and third version of content according to some examples of the present disclosure

FIG. 13 shows block diagrams of example archives for a first 1302, second 1304, and third 1306 version of content. As discussed above, the process of updating content across multiple revisions is fast and efficient since the files in the archives are organized in a meaningful manner. The content service 31000 (FIG. 9) may determine the current version residing on the user device and the version to which the current version should be updated. Using this information, the content service 31000 may be capable of performing a linear search of the archive for the version to which the current version should be updated and find the new and/or revised files to be downloaded. The example of updating content as depicted in FIG. 13 may be described with reference to FIGS. 14(*a*) and 14(*b*), which depict examples of metadata for Archive 1 and Archive 2 shown in FIG. 13. As shown in FIGS. 14(*a*) and 14(*b*), metadata for each archive may include a reference number indicating the order or sequence of the files, the filename of the files, the version with which the files are associated, and the path where the files are stored.

If a user device has the first version 1302 of content which is to be updated to the second version 1304 of the content, the changes made to the content in the second version 1304 may be determined and downloaded onto the user device. The content service 31000 (FIG. 9) may access the metadata MD1 for the second version 1304 of Archive 1, which is shown in FIG. 14(*a*). Since the content service 31000 knows that the user device contains the first version 1302 of content, the content service 31000 may sequentially search the list of files in MD 1 for the second version 1304 of Archive 1 until it finds the first new file associated with a version that is newer than the first version 1302. As shown in FIG. 14(*a*), the first new file is file A, since it is the first new file that is associated with a newer version (e.g., the second version 1304). The content service 31000 may provide file A (stored at the path location specified in the metadata) to the user device so that the user device may contain the updated revisions in the second version 1304.

The content service 31000 (FIG. 9) may also access the metadata MD2 for the second version 1304 of Archive 2, which is shown in FIG. 14(*b*). Since the content service 31000 knows that the user device contains the first version 1302 of content, the content service 31000 may search the list of files in MD2 for the second version 1304 of Archive 2 until it finds the first new file associated with a version that is newer than the first version 1302. The search may be performed in any logical manner for finding the first new file, such as searching the list of files sequentially. As shown in FIG. 14(*b*), the first new file is file H, since it is the first new file that is associated with the newer version (e.g., the second version 1304). The content service 31000 may provide file H (stored at the path location specified in the metadata) to the user device so that the user device may contain the updated revisions in the second version 1204.

The content service 31000 (FIG. 9) may also compare the list of files in MD2 for the first version 1302 of Archive 2 to the list of files in MD2 for the second version 1304 of Archive 2. As shown in FIG. 14(*b*), MD2 for the first version 1302 of Archive 2 includes files D, E, F, and G. MD2 for the second version 1304 of Archive 2 includes files D, E, F, and H. The content service 31000 may compare these lists of files and determine that file G is missing from the second version 1304. The content service 31000 may instruct the user device to delete file G, since file G is not included in the updated version.

If a user device has the second version 1304 of content which is to be updated to the third version 1306 of the content, the changes made to the content in the third version 1306 may be determined and downloaded onto the user device. The content service 31000 (FIG. 9) may access the metadata MD1 for the third version 1306 of Archive 1, which is shown in FIG. 14(*a*). Since the content service 31000 knows that the user device contains the second version 1304 of content, the content service 31000 may sequentially search the list of files in MD1 for the third version 1306 of Archive 1 until it finds the first new file associated with a version that is newer than the second version 1304. As shown in FIG. 14(*a*), the first new file is file C, since it is the first new file that is associated with a version that is newer than the second version 1304 (e.g., the third version 1306). The content service 31000 may provide file C (stored at the path location specified in the metadata) to the user device so that the user device may contain the updated revisions in the third revision 1306.

The content service 31000 (FIG. 9) may also access the metadata MD2 for the third version 1306 of Archive 2, which is shown in FIG. 14(*b*). Since the content service 31000 knows that the user device contains the second version 1304 of content, the content service 31000 may sequentially search the list of files in MD2 for the third version 1306 of Archive 2 until it finds the first new file associated with a version that is newer than the second version 1304. As shown in FIG. 14(*b*), each file in the third version 1306 of Archive 2 is associated with a version that is either the first 1302 or second version 1304. Thus, the content service 31000 may determine that Archive 2 does not contain any newer content to be downloaded.

Additionally, updating content from the first version 1302 to the third version 1306 may be performed in a fast and efficient manner, avoiding the need to download content that may be relevant to the second version 1304 but irrelevant to the third version 1306. If a user device has the first version 1302 of content which is to be updated to the third version 1306 of the content, the changes made to the content in the third version 1306 may be determined and downloaded onto the user device. The content service 31000 (FIG. 9) may access the metadata MD1 for the third version 1306 of Archive 1, which is shown in FIG. 14(*a*). Since the content service 31000 knows that the user device contains the first version 1302 of content, the content service 31000 may sequentially search the list of files in MD1 for the third version 1306 of Archive 1 until it finds the first new file associated with a version that is newer than the first version 1302. As shown in FIG. 14(*a*), the first new file is file A, since it is the first new file that is associated with a version that is newer than the first version 1302 (e.g., the second version 1304). The content service 31000 may provide file A (stored at the path location specified in the metadata) to the user device so that the user device may contain the updated revisions in the third version 1306. The content service 31000 may also provide to the user device any files being ordered sequentially after the first new file. That is, the content service 31000 may provide file C (stored at the path location specified in the metadata) to the user device so that the user device may contain the updated revisions in the third version 1306.

The content service 31000 (FIG. 9) may also access the metadata MD2 for the third version 1306 of Archive 2, which is shown in FIG. 14(*b*). Since the content service 31000 knows that the user device contains the first version 1302 of content, the content service 31000 may sequentially search the list of files in MD2 for the third version 1306 of Archive 2 until it finds the first new file associated with a version that is newer than the first version 1302. As shown in FIG. 14(*b*), the first new file is file H, since it is the first new file that is associated with the newer version (e.g., the second version 1304). The content service 31000 may provide file H (stored at the path location specified in the metadata) to the user device so that the user device may contain the updated revisions in the second version 1304. The content service 31000 may also perform a comparison of the list of files in the first version 1302 of Archive 2 to the list of files in the third version 1306 of Archive 2 in order to determine any files that need to be deleted from the user device. In the example of FIG. 13, the content service 31000 may determine that file G should be deleted from the user device, since file G is missing from the third version 1306 of Archive 2, and may accordingly instruct the user device to delete file G.

In some embodiments, an update to content may include a revision to most or all of the files in an archive. In this case, downloading the contents of the entire archive may be a more efficient process for updating the content on the user device. The content service 31000 (FIG. 9) may create an instruction file indicating that the download should begin for all files ordered sequentially after the instruction file. This instruction file may be ordered at the beginning of the list of files so that when the archive is sequentially accessed, the instruction file will be accessed first and subsequent files may be provided to the user device.

Figure 15:
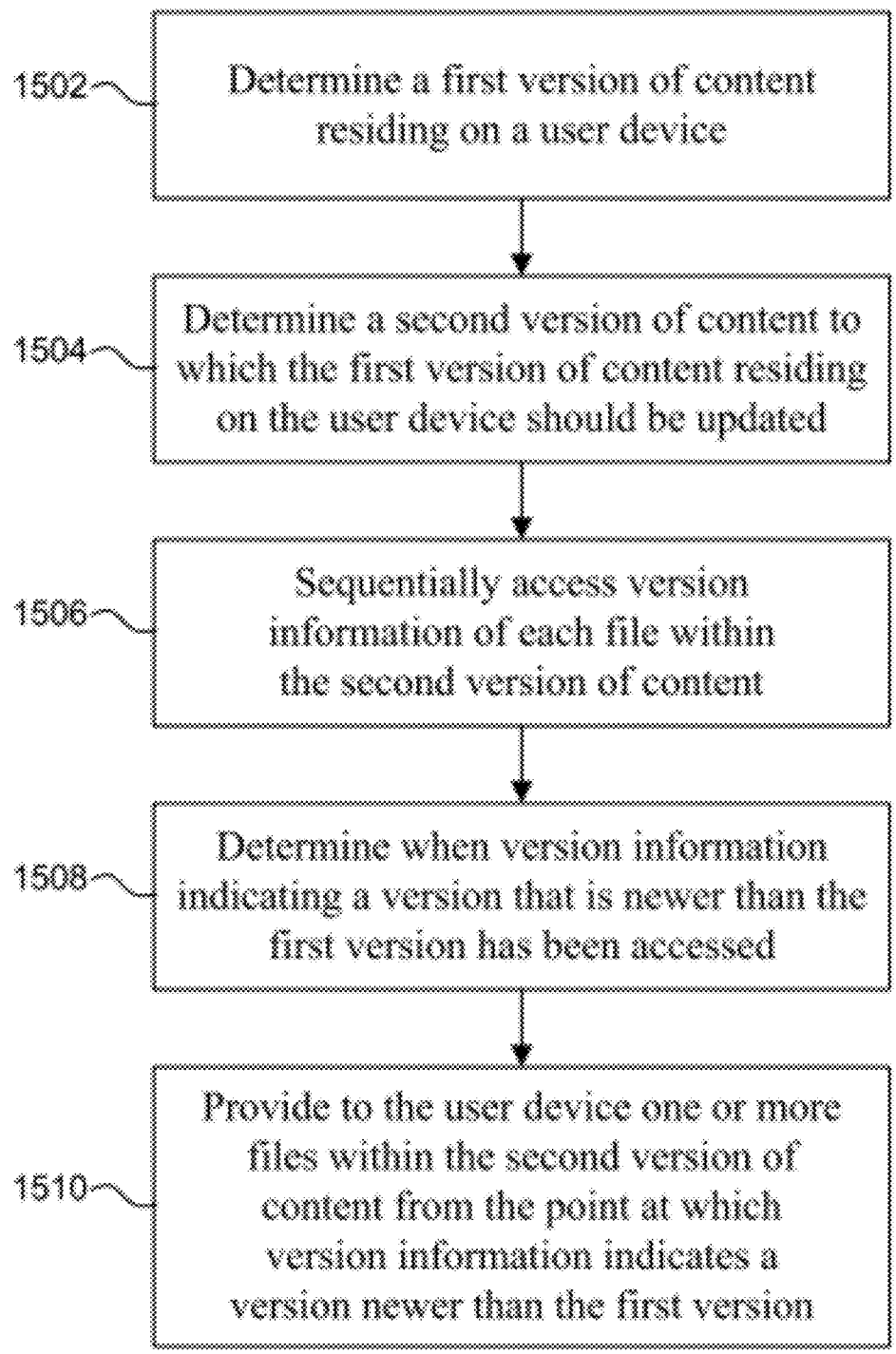
FIG. 15 is a flow chart showing an example method of updating content according to some examples of the present disclosure.

FIG. 15 is a flow chart showing an example method of updating content. In operation 1502, the content service 31000 (FIG. 9) may determine a first version of content residing on a user device. The first version of content may be associated with a first archive that has a first set of files organized within the first archive in a first order based on when each file in the first set of files was last modified, wherein each file within the first set of files is associated with the first version.

In operation 1504, the content service 31000 (FIG. 9) may also determine a second version of content to which the first version of content residing on the user device should be updated. The second version of content may be associated with a second archive that has a second set of files organized within the second archive in a second order based on when each file in the second set of files was last modified, wherein the second set of files has at least one new file being associated with the second version.

In operation 1506, the content service 31000 (FIG. 9) may sequentially access version information of each file within the second version of content. The version information may be accessed based on the second order of the second set of files in the second archive and may indicate the version of each file.

In operation 1508, the content service 31000 (FIG. 9) may determine when version information indicating a version that is newer than the first version has been accessed from the second archive. This determination may include determining a first new file associated with when the version information indicating the newer version of content has been accessed, wherein the newer version of content was created after the first version of content was created.

In operation 1510, the content service 31000 (FIG. 9) may provide to the user device one or more files within the second version of content from the point at which version information indicates a version newer than the first version. That is, the first new file and any additional files being ordered within the second archive sequentially after the first new file may be provided to the user device.

Example Machine Implementation

Figure 16:
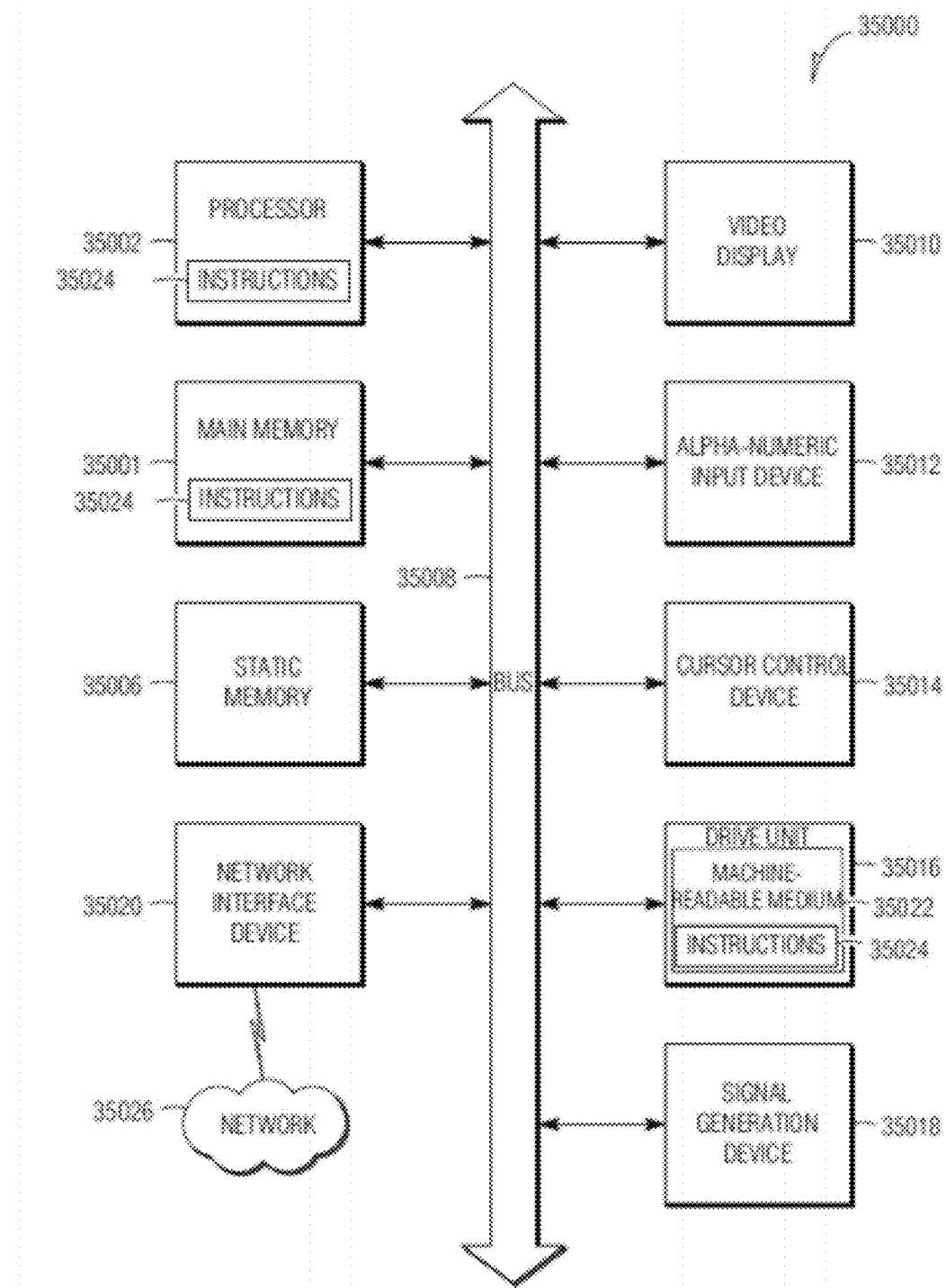
FIG. 16 shows an example computing system according to some examples of the present disclosure.

FIG. 16 shows a diagrammatic representation of a machine in the example form of a computer system 35000 within which a set of instructions for causing the machine to perform any one or more of the methods, processes, operations, or methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments may also be practiced in distributed system environments where local and remote computer systems which are linked (e.g., either by hardwired, wireless, or a combination of hardwired and wireless connections) through a network, both perform tasks. In a distributed system environment, program modules may be located in both local and remote memory-storage devices (see below).

The example computer system 35000 includes a processor 35002 (e.g., a central processing unit (CPU), a graphics processing unit (GPU) or both), a main memory 35001 and a static memory 35006, which communicate with each other via a bus 35008. The computer system 35000 may further include a video display unit 35010 (e.g., a liquid crystal display (LCD) or a cathode ray tube (CRT)). The computer system 35000 also includes an alphanumeric input device 35012 (e.g., a keyboard), a user interface (UI) cursor controller 35014 (e.g., a mouse), a disk drive unit 35016, a signal generation device 35018 (e.g., a speaker) and a network interface device 35020 (e.g., a transmitter).

The disk drive unit 35016 includes a machine-readable medium 35022 on which is stored one or more sets of instructions 35024 and data structures (e.g., software) embodying or used by any one or more of the methodologies or functions illustrated herein. The software may also reside, completely or at least partially, within the main memory 35001 and/or within the processor 35002 during execution thereof by the computer system 35000, the main memory 35001 and the processor 35002 also constituting machine-readable media.

The instructions 35024 may further be transmitted or received over a network 35026 via the network interface device 35020 using any one of a number of well-known transfer protocols (e.g., HTTP, session initiation protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium. In some examples the machine-readable medium may be limited to non-transitory machine-readable mediums.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer-readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

Additional Notes

The above detailed description includes references to the accompanying drawings, which form a part of the detailed description. The drawings show, by way of illustration, specific embodiments in which the technology may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the embodiments of the invention should be determined with reference to the appended claims, along with the full scope of equivalents to which such claims are entitled.

What is claimed is:

1. A method of updating content, comprising:
determining, using a server, a first version of content residing on a user device, the first version of the content being associated with a first archive having a first set of files organized within the first archive in a first sequential order based on when each file in the first set of files was last modified, each file within the first set of files being associated with the first version;
determining, using the server, a second version of the content, the second version of the content being associated with a second archive having a second set of files organized within the second archive in a second sequential order based on when each file in the second set of files was last modified, the second set of files having at least one subject file associated with the second version in a sequential order with respect to other files in the second set of files that is different from a sequential order of a corresponding file associated with the first version with respect to other files in the first set of files;
using the server, sequentially accessing, based on the second order of the second set of files in the second archive, version information of each file within the second set of files, the version information indicating a version of each file;
determining from the version information of the files of the second set of files that at least the subject file is associated with a newer version of the content than that which resides on the user device; and
allowing the user device to retrieve the subject file of the second set of files and additional files of the second set of files being ordered within the second archive sequentially after the subject file.

2. The method of claim 1, further comprising:
comparing the first set of files in the first archive to the second set of files in the second archive;
determining one or more files being included in the first set of files and excluded from the second set of files; and
instructing the user device to delete the one or more files from the user device.

3. The method of claim 1, wherein the second archive maintains metadata associated with the second order of the second set of files, the version information of each file within the second set of files being included in the metadata.

4. The method of claim 1, wherein the subject file is associated with an addition of new content to the first version of the content residing on the user device.

5. The method of claim 1, wherein the subject file is associated with a modification of at least a portion of the first version of the content residing on the user device.

6. The method of claim 1, wherein the subject file is associated with a deletion of at least a portion of the first version of the content residing on the user device.

7. The method of claim 1, further comprising:
receiving a revision to the first version of the content; and
creating the second archive in response to receiving the revision.

8. The method of claim 7, further comprising:
sending a notification to the user device indicating the revision to the first version of the content.

9. The method of claim 1, wherein the method is performed in response to receiving a request to update the first version of the content residing on the user device.

10. The method of claim 1, wherein the method is automatically performed when new content becomes available.

11. A system, comprising:
an archive storage medium configured to store archives of files; and
a delivery module configured to:
determine a first version of content residing on a user device, the first version of the content being associated with a first archive in the archive storage medium having a first set of files organized within the first archive in a first sequential order based on when each file in the first set of files was last modified, each file within the first set of files being associated with the first version,
determine a second version of the content, the second version of the content being associated with a second archive in the archive storage medium having a second set of files organized within the second archive in a second sequential order based on when each file in the second set of files was last modified, the second set of files having at least one subject file associated with the second version in a sequential order with respect to other files in the second set of files that is different from a sequential order of a corresponding file associated with the first version with respect to other files in the first set of files,
sequentially access, based on the second order of the second set of files in the second archive, version information of each file within the second set of files, the version information indicating a version of each file,
determine from the version information of the files of the second set of files that at least the subject file is associated with a newer version of the content than that which resides on the user device, and
allowing the user device to retrieve the subject file of the second set of files and additional files of the second set of files being ordered within the second archive sequentially after the subject file.

12. The system of claim 11, wherein the delivery module is further configured to:
compare the first set of files in the first archive to the second set of files in the second archive;
determine one or more files being included in the first set of files and excluded from the second set of files; and
instruct the user device to delete the one or more files from the user device.

13. The system of claim 11, wherein the second archive maintains metadata associated with the second order of the second set of files, the version information of each file within the second set of files being included in the metadata.

14. The system of claim 11, wherein the subject file is associated with an addition of new content to the first version of the content residing on the user device.

15. The system of claim 11, the subject file is associated with a modification of at least a portion of the first version of the content residing on the user device.

16. The system of claim 11, the subject file is associated with a deletion of at least a portion of the first version of the content residing on the user device.

17. A computer-readable storage medium storing instructions which, when executed by a processor, cause the processor to perform operations comprising:
determining a first version of content residing on a user device, the first version of the content being associated with a first archive having a first set of files organized within the first archive in a first sequential order based on when each file in the first set of files was last modified, each file within the first set of files being associated with the first version;

determining a second version of the content, the second version of the content being associated with a second archive having a second set of files organized within the second archive in a second sequential order based on when each file in the second set of files was last modified, the second set of files having at least one subject file associated with the second version in a sequential order with respect to other files in the second set of files that is different from a sequential order of a corresponding file associated with the first version with respect to other files in the first set of files;

sequentially accessing, based on the second order of the second set of files in the second archive, version information of each file within the second set of files, the version information indicating a version of each file;

determining from the version information of the files of the second set of files that at least the subject file is associated with a newer version of the content than that which resides on the user device; and allowing the user device to retrieve the subject file of the second set of files and any additional files of the second set of files being ordered within the second archive sequentially after the subject file.

18. The computer-readable storage medium of claim 17, wherein the instructions further cause the processor to perform operations comprising:

comparing the first set of files in the first archive to the second set of files in the second archive;

determining one or more files being included in the first set of files and excluded from the second set of files; and instructing the user device to delete the one or more files from the user device.

19. The computer-readable storage medium of claim 17, wherein the subject file is associated with an addition of new content to the first version of the content residing on the user device.

20. The computer-readable storage medium of claim 17, the subject file is associated with a modification of at least a portion of the first version of the content residing on the user device.

* * * * *